United States Patent
Zerbe et al.

(10) Patent No.: US 8,930,740 B2
(45) Date of Patent: Jan. 6, 2015

(54) REGULATION OF MEMORY IO TIMING USING PROGRAMMATIC CONTROL OVER MEMORY DEVICE IO TIMING

(75) Inventors: Jared L. Zerbe, Woodside, CA (US); Scott C. Best, Palo Alto, CA (US); Brian L. Leibowitz, San Francisco, CA (US)

(73) Assignee: Rambus Inc., Sunnyvale, CA (US)

( * ) Notice: Subject to any disclaimer, the term of this patent is extended or adjusted under 35 U.S.C. 154(b) by 715 days.

(21) Appl. No.: 12/947,758

(22) Filed: Nov. 16, 2010

(65) Prior Publication Data

US 2011/0208990 A1 Aug. 25, 2011

Related U.S. Application Data

(60) Provisional application No. 61/307,254, filed on Feb. 23, 2010.

(51) Int. Cl.
| | | |
|---|---|---|
| *G06F 1/00* | (2006.01) | |
| *G06F 1/08* | (2006.01) | |
| *G06F 13/16* | (2006.01) | |
| *G06F 1/32* | (2006.01) | |

(52) U.S. Cl.
CPC ............. *G06F 1/08* (2013.01); *G06F 13/1689* (2013.01); *G06F 1/32* (2013.01)
USPC ........................................................ 713/500

(58) Field of Classification Search
USPC ........................................................ 713/500
See application file for complete search history.

(56) References Cited

U.S. PATENT DOCUMENTS

| | | | | |
|---|---|---|---|---|
| 5,414,390 A | * | 5/1995 | Kovacs et al. ..................... | 331/2 |
| 5,606,348 A | * | 2/1997 | Chiu .............................. | 345/213 |
| 6,700,945 B2 | * | 3/2004 | Maeda ........................... | 375/376 |
| 7,071,757 B2 | | 7/2006 | Bonaccio et al. | |
| 7,162,672 B2 | * | 1/2007 | Werner et al. .................. | 714/724 |
| 2005/0254508 A1 | * | 11/2005 | Aksu et al. ..................... | 370/428 |
| 2006/0181939 A1 | * | 8/2006 | Fuhrmann et al. ........ | 365/189.11 |
| 2007/0206674 A1 | * | 9/2007 | Ziauddin et al. ......... | 375/240.05 |
| 2008/0181221 A1 | * | 7/2008 | Kampmann et al. .......... | 370/389 |
| 2011/0084744 A1 | * | 4/2011 | Nishioka et al. .............. | 327/161 |

OTHER PUBLICATIONS

Pangjun et al., "Low-Power Clock Distribution Using Multiple Voltages and Reduced Swings", IEEE transactions on Very Large Scale Integration (VLSI) systems, vol. 10, No. 3, Jun. 2002, pp. 309-318. 10 pages.

(Continued)

*Primary Examiner* — Mohammed Rehman
(74) *Attorney, Agent, or Firm* — Marc P. Schuyler

(57) ABSTRACT

This disclosure provides for adjustment of memory IO timing using a voltage controlled oscillator (VCO) and a register that generates a VCO control voltage directly used to vary memory IO timing. The register may be externally programmable by a controller and may be located on a memory device (IC, module or other device) or on an external voltage generator, which then provides an adjustable voltage to the memory device. This structure may be used to adjust memory timing so as to achieve a minimum target bitrate and thus minimize frequency of operation to minimize power. In one embodiment, each of several memory devices may be independently adjusted in this way to achieve a mesochronous memory system; in another embodiment, memory devices may be have their timing adjusted in parallel, with all memory devices equal to or greater than a target bitrate. Teachings presented herein provide a way to relax overdesign requirements and "tune" fast-fast and slow-slow devices to effectively operate as typical devices.

21 Claims, 9 Drawing Sheets

(56) References Cited

OTHER PUBLICATIONS

Ta, Paul D. et al., "A Low Power Clock Distribution Scheme for Complex IC System", ASIC Conference and Exhibit, 1991. Proceedings, Fourth Annual IEEE International Rochester, NY, USA Sep. 23-27, 1991, New York, NY, USA, IEEE, US Sep. 23, 1991, pp. P1-5.1 to P1-5.4, XP010048471.

* cited by examiner

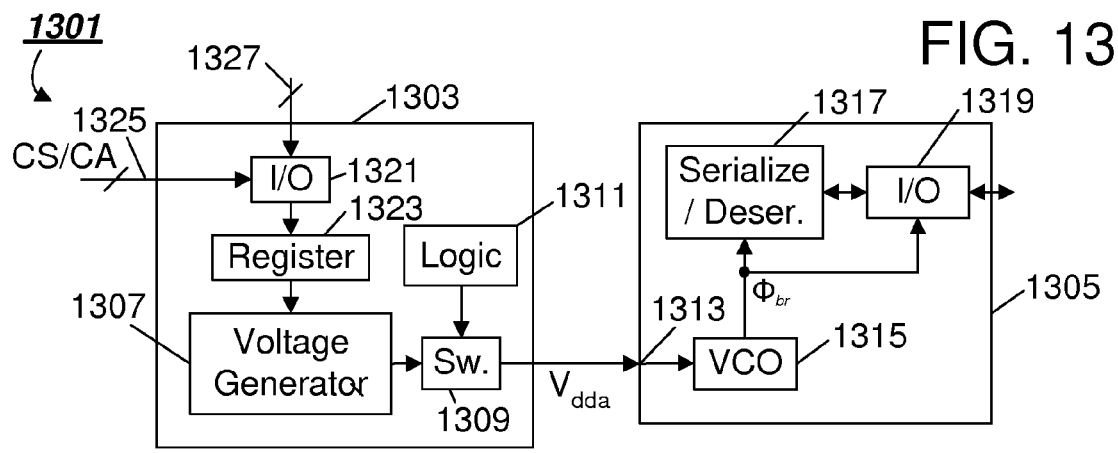
FIG. 13
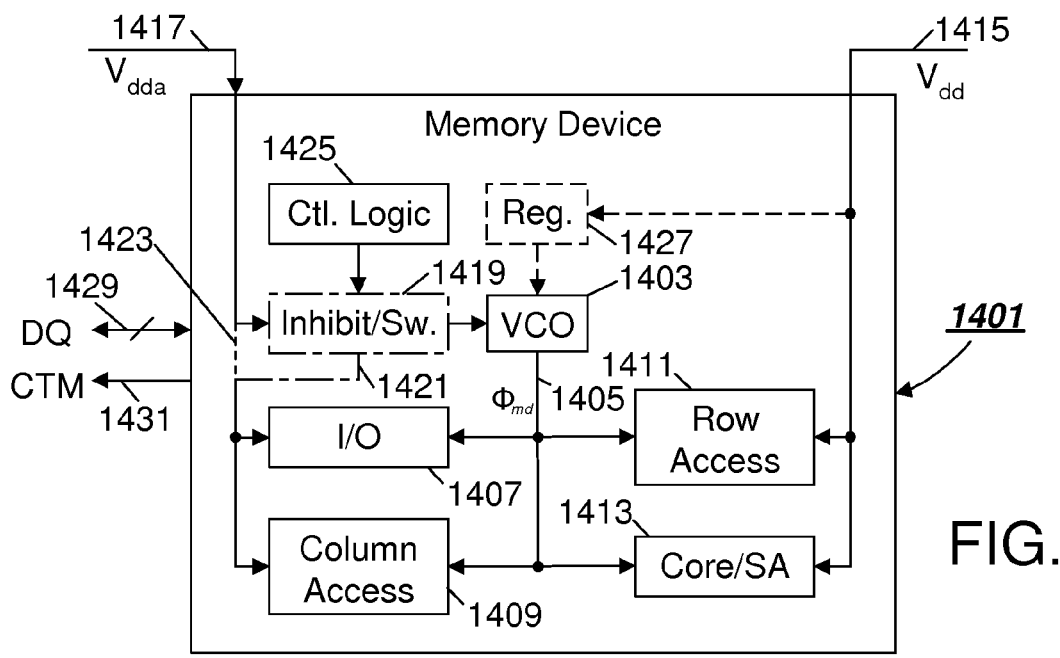
FIG. 14
FIG. 15

REGULATION OF MEMORY IO TIMING USING PROGRAMMATIC CONTROL OVER MEMORY DEVICE IO TIMING

BACKGROUND

As data transfer rates continue to increase, it becomes increasingly difficult to build robust signaling systems that are relatively error free and low power. In digital memory systems in particular, sophisticated, relatively power-hungry circuitry is often employed in memory devices to achieve exact timing alignment with a clock signal provided by a memory controller. In addition to conventional use of relatively power-hungry circuitry in memory devices (such as a phase-locked loop, for example) to drive an on-memory-chip clock distribution network, conventional design wisdom typically calls for overdesign of logic gates, under the assumption that manufacturing tolerances will produce a predictable range of performance capabilities at a given clock rate and power supply and under the assumption that such overdesign is necessary to ensure that almost every manufactured device will meet specification. While such overdesign is generally quite successful at minimizing the number of products not meeting specification, it typically results in excessive power consumption for the great majority of devices which were manufactured at faster process corners while operating at a performance level set by the slowest process corner.

What is needed is a scheme to achieve relatively precise control over memory timing. A need also exists for a memory system that economizes power; further still, a need exists for a memory clocking scheme that better tolerates design process variations, enabling relatively simpler memory device design as well as minimization of power used by devices manufactured in the faster process corners. The present invention satisfies these needs and provides further, related advantages.

BRIEF DESCRIPTION OF THE DRAWINGS

FIG. 13 provides a diagram similar to the embodiment of FIG. 12. In this example, however, the switch 1309 is co-located with the voltage regulator, that is, remotely from the memory device 1305. Presence of the switch on the voltage regulator provides different options for depowering the memory device VCO, under auspices of control logic 1311 on the voltage regulator.

FIG. 14 provides a circuit diagram for one embodiment 1401 where two different power supplies $V_{dda}$ and $V_{dd}$ are used to power different memory device circuitry.

FIG. 15 illustrates relative potential power savings for different circuitry-to-power supply configurations. Each of several rows 1511, 1513, 1515, 1517, 1519 and 1521 represent different combinations of circuits coupled to the respective scaled and non-scaled power supplies, with greater power savings potentially being achieved the further one travels down the rows (i.e., with row 1521 representing the greatest potential power savings).

FIG. 18 helps illustrate another advantage presented by this disclosure, namely, that if desired, slow and fast memory devices may be grouped together (e.g., "SS" devices on the first memory module 1807 and "FF" device on the second memory module 1809), with each module separately adjusted (in term of a VCO) to take advantage of maximum power savings for its group of included memory ICs.

DETAILED DESCRIPTION

Figure 1:
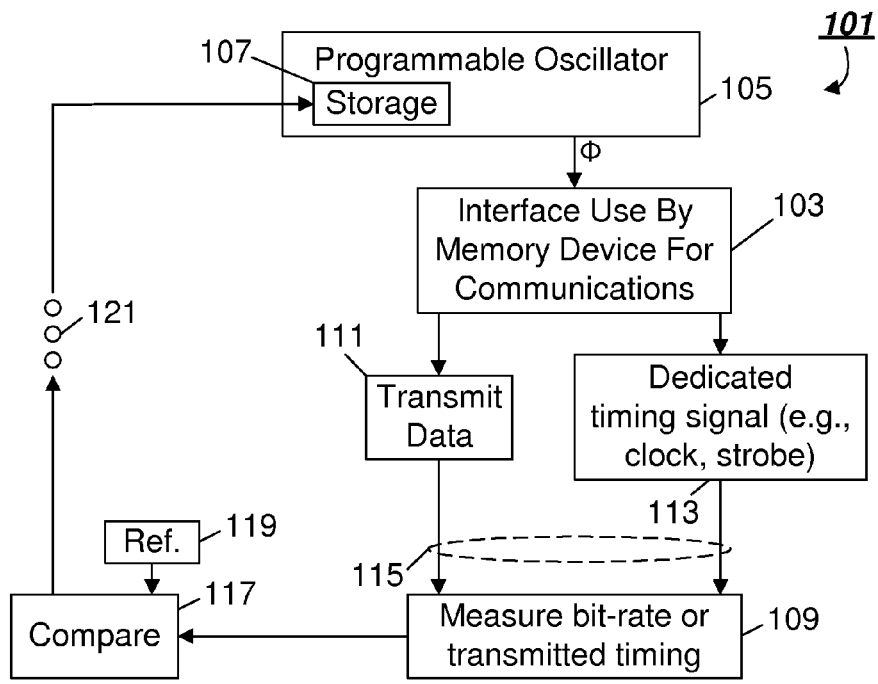
FIG. 1 is a flow diagram for one embodiment, where I/O timing of a memory device may be controlled or adjusted by a remote device using feedback.

The invention defined by the enumerated claims may be better understood by referring to the following detailed description, which should be read in conjunction with the accompanying drawings. This description of one or more particular embodiments, set out below to enable one to build and use various implementations of the invention or inventions set forth by the claims, is not intended to limit the enumerated claims, but to exemplify their application to certain methods and devices. The description set out below exemplifies (i) an apparatus having a memory device (e.g., such as a memory system), (ii) a memory device, (iii) a memory controller, and (iv) other related circuits and methods. The invention, however, may also be applied to other methods and devices as well.

I. INTRODUCTION

Embodiments presented by this disclosure address the problems mentioned earlier by providing a slave device, such as a memory device, with IO timing that may be programmatically controlled or adjusted using feedback, e.g., adjusted by a controller so that the slave device meets a target clock rate or IO bitrate. More specifically, in several embodiments presented below, each of several memory devices may be supplied with its own on-board oscillation source, with the controller programmatically adjusting each memory device to be faster or slower as necessary to meet desired goals; for example, a controller may orchestrate each of multiple memory devices toward a common bitrate, notwithstanding variations in silicon in each memory device that may render the device faster or slower. In conjunction with these principles, memory devices, such as DRAM integrated circuits, need no longer be rigorously "overdesigned" to ensure predictable bitrate (or clock rate), but rather, may have their timing tuned up or down, based on feedback, until desired rate is achieved with precision. As used herein, the terms "bitrate," "timing," "clock frequency" will be used in an overlapping manner, i.e., the point is that timing may be adjusted, irrespective of whether the timing is reflected in memory device bitrate, clock frequency, or some other manner. Thus, whether the device is fast-fast ("FF"), slow-slow ("SS") or typical-typical ("TT"), or has been manufactured at some other process corner, it can be adjusted to operate at a rate that meets any desired goals. As further used herein, a "memory device" should be understood to mean any memory apparatus, encompassing memory modules having several memory circuits, individual memory IC's, and other forms of devices, and as alluded to above, the principles discussed herein can be applied to any form of master and slave device implementing a high-speed communication link, such as master controller and a slave peripheral on a peripheral interconnect bus.

These techniques provide a number of significant advantages pertinent to the design of memory systems and associated components, in particular, for memory controllers, memory modules or memory chips. First, the design process is greatly simplified as the timing distribution components of memory devices need no longer be rigorously overdesigned to minimize the number of bad chips, i.e., even devices that are slow relative to specification can be tuned and seamlessly utilized using the feedback process mentioned above. Second, by utilizing independent timing source control for each memory device, for example, through the use of independently-controlled voltage controlled oscillators ("VCOs") or other forms of programmable oscillators, each memory device may be tuned if desired to specific timing such as a specific target bitrate. Third, the techniques mentioned above provide for a number of power-savings processes—in one embodiment, each memory device has its power supply voltage and thus frequency tuned to approximately a minimum target bitrate; as the majority of consumed power of an IO interface is dependent upon the square of voltage times frequency, this technique reduces overall power. In a second embodiment, where multiple memory devices are controlled together such that the slowest device is set approximately to the minimum bit-rate, relatively faster devices can be shut down after sending or receiving their bits (by dropping a control voltage to freeze a memory clock), thereby minimizing average power consumption for faster devices and for the system as a whole.

These and other benefits and design options will be further discussed below.

II. AN EXEMPLARY SYSTEM

FIG. 1 provides a diagram of the operation of a first embodiment 101, relating to memory IO operations. A memory device includes an interface (IO) 103 that it uses for communications with a remote device (such as a memory controller or CPU, with a CPU generally including a built-in memory controller, especially in small device applications such as a cell phone). As is conventional, a communications bus connects the memory IO with the memory controller or other device and carries communications transmitted by the memory IO using a transmit circuit (that sends signals at the edge of a transmit clock signal) and received by the memory IO using a receive circuit (that samples voltage on a specific link of the bus at the edge of a receive clock signal); these links may if desired utilize connections which are one in the same, i.e., either a bidirectional link, or separate unidirectional links may be used. The embodiment of FIG. 1 also provides a programmable oscillator 105 for the purpose of maintaining and changing memory device timing, such as transmit and/or receive timing just mentioned. As mentioned, a benefit of this design is that it facilitates the use of feedback to relax manufacturing constraints otherwise imposed to minimize the number of bad memory devices in bulk manufacturing. The programmable oscillator of FIG. 1 includes a storage element 107 and, responsive to the contents of the storage element, generates a timing signal "Φ" that is supplied to the memory IO interface 103 for purposes of defining transmit timing and receive timing. In a typical implementation, Φ can be directly applied as the timing signal for each of the transmit and receive circuits, and it is also possible to apply phase offsets or to scale Φ in some manner to derive specific transmit or receive timing control signals; in several embodiments discussed below, these phase offsets will be applied at the controller, effectively such that memory device transmit and receive timing may be directly driven by the programmable oscillator without additional phase adjustment. Timing of the memory device IO interface is measured, per process 109, either by measuring the bitrate of data transmitted by the memory device or by measuring a direct (e.g., dedicated) timing signal, per processes 111 or 113. It should be understood that many of the timing signals generated by a memory device, including a transmit clock, a receive clock, and other timing signals as appropriate to the embodiment, bear a relationship to one another, and any one of these may be measured and compared to a benchmark to determine or assess memory IO timing against a reference, all as indicated by a number of dashed line options 115. The comparison is performed by a compare circuit 117, which compares measured memory device timing against the reference (denoted by block 119). In one embodiment, the comparison is performed in the memory controller or CPU, but it can also be done in the memory, and nearly any type of comparison process may be used as appropriate to the particular embodiment. In the context of FIG. 1 and other embodiments presented below, the comparison circuit determines whether memory IO timing bears a desired relationship to the reference (e.g., it is approximately equal to, greater than, or less than the reference, is a specific multiple of the reference, or bears some other defined relationship). A process, represented by ellipses 121, determines the proper adjustment to contents of the storage element 107. In some embodiments, the storage element can be a capacitor, storage register, or other device capable of holding or representing a variable value that can be used to control oscillation; also, in some embodiments, the programmable oscillator 105 can be a voltage controlled oscillator ("VCO"), driven using a voltage generated in dependence on contents of the storage element. The programmable oscillator and portions of the interface 103 may share similar transistor design and, if desired, the voltage generated to control oscillation may also be utilized by some portions of interface 103, as the generated voltage is ideally suited for handling synchronous circuit operations of frequency "Φ".

Thus, in summary of FIG. 1, responsive to the output of the comparison circuit, memory timing is programmatically adjusted.

Various FIGS. discussed below will be used to add to or elaborate upon the principles discussed above, or to present alternative features. Several of these embodiments involve systems that include a memory controller and a memory device. For example, in one implementation, the compare circuit may be on a memory controller, which then itself measures memory device timing. To provide two other examples, a programmable oscillator, including a voltage controlled oscillator ("VCO"), a voltage generator and the storage element which controls it, may be housed on the memory device (e.g., as part of a memory IC), on a memory module (e.g., a board having several independent memory circuits) or on a special purpose voltage generator chip, distinct from memory controller, memory device, or memory module control. Furthermore, in addition to using a VCO, other type of controllable oscillators may be used, such as current-controlled oscillators (ICO) or a digitally controlled oscillator (DCO). One example of a DCO is an oscillator with digitally switched capacitive loads that alter the oscillation frequency.

Figure 2:
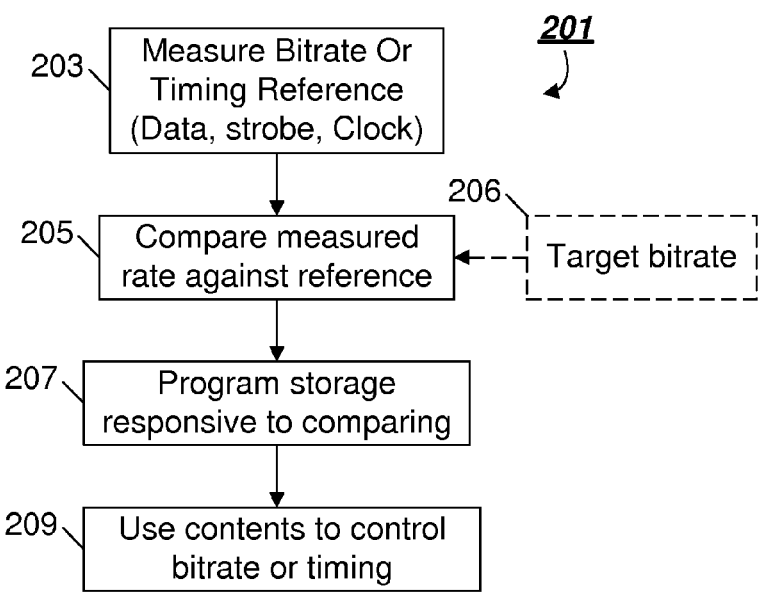
FIG. 2 is a flowchart of a method 201 performed by the embodiment of FIG. 1.

FIG. 2 is a flowchart of a method 201 practiced by the embodiment of FIG. 1. As indicated by FIG. 2, IO timing is determined (i) by measuring bitrate of communication, (ii) based on supplied device timing (e.g., using a clock, strobe or other reference signal), or (iii) by some other method. This process is indicated by process block 203. The measured timing is then compared to a reference, per process 205. As with other FIGS. below, dashed lines are used to denote an optional process or feature, and box 206 indicates that the reference just referred to may be a target bitrate. Responsive to the comparison, a storage element is then loaded with a value that will govern the device timing, and the timing is then adjusted under the governance of the storage element value; these steps are respectively indicated by processes 207 and 209.

One advantage provided by using a target bitrate as the reference, particularly a minimum target bitrate, relates to power savings. It is well known that for CMOS logic, switching power is expended according to the equation $$P = CV^2 F$$

where "C" refers to capacitance, "V" refers to voltage and "F" refers to frequency. Thus, by adjusting memory IO data rate up or down to a desired minimum, not only may design disadvantages associated by overdesign be reduced (i.e., the device may be driven more or less aggressively to compensate for fast or slow corners), but power may also be simultaneously reduced to a minimum for the device. In other implementations, also exemplified by some embodiments provided below, it is possible to also reduce memory device voltage, thereby further increasing potential power savings vis-à-vis some conventional designs. Designs such as these may find their most advantageous implementation in cell phones and other forms of portable devices (including portable computers), and other low power applications.

III. A SYSTEM HAVING A MEMORY CONTROLLER AND MEMORY DEVICE

Figure 3:
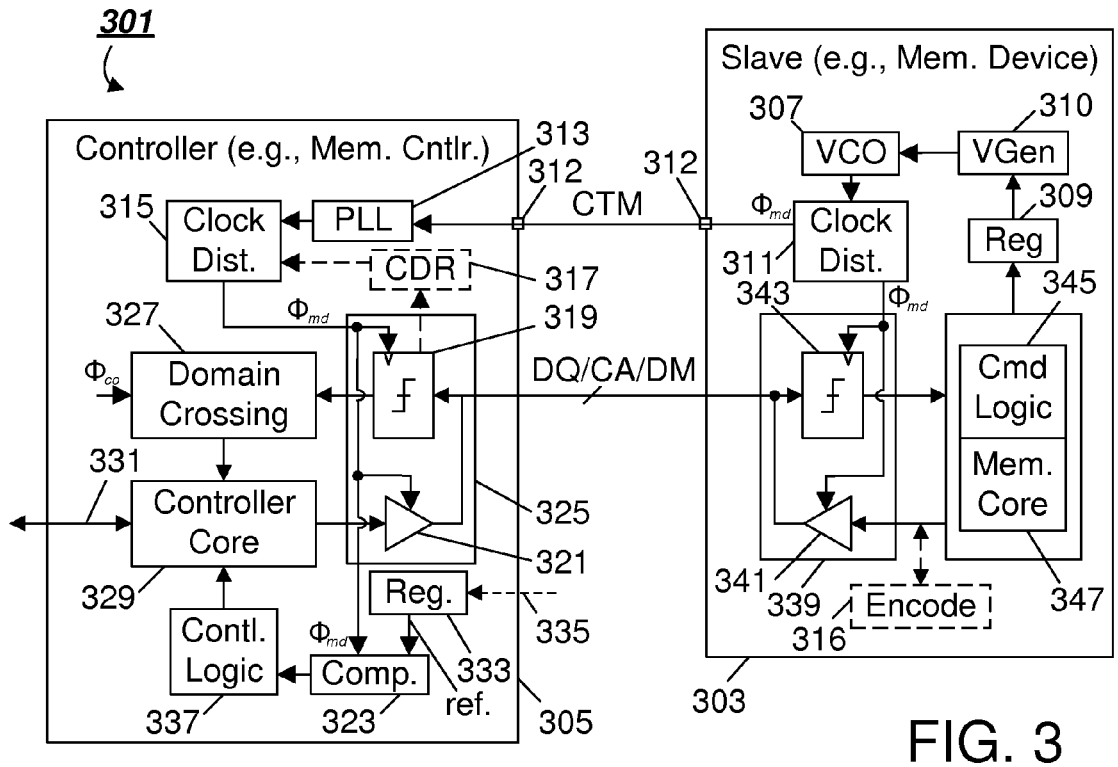
FIG. 3 provides a detailed view of a system embodiment 301. The system generally includes at least one memory or other slave device 303 and a controller 305 (such as a memory controller), these two or more elements being connected by one or more communication links (labeled "DQ/CA/DM") and by a clock to master or "CTM" timing signal sent from the slave device to the controller. The controller adjusts contents of a slave device register 309, thereby adjusting VCO 307 to change slave device bitrate relative to a target value.

FIG. 3 shows a rough schematic of a memory system 301, having a memory device 303 and a memory controller 305. In the embodiment of FIG. 3, the memory device may be a dynamic access memory ("DRAM"), though it is also possible to use other forms of memory such as non-volatile or other forms of memory. The system may also be implemented as one or more discrete integrated circuits ("ICs"), and each IC may be multiple-die or single die (that is, with a single, integral piece of silicon circuitry). The system includes a VCO 307, a storage element such as a register 309, and a voltage generator 310, which together represent a programmable oscillator used to vary memory device timing and data transmit and/or sampling rate; as mentioned above, a number of well-known variable oscillators may also be used in lieu of a VCO. In the embodiment of FIG. 3, the VCO, register and voltage generator are all mounted on the memory device, and the register or other storage device is externally programmable (i.e., programmed by commands issued by the memory controller to the memory device).

The memory device 303 includes a clock distribution tree 311, which essentially represents a set of parallel paths that distribute timing signals ($\Phi_{md}$) so as to avoid timing skew between multiple receivers or transmitters. For example, FIG. 3 shows a bus interconnecting the memory device and memory controller labeled "DQ/CA/DM," representing one or more of data signal paths, control or address signal paths, data mask, or other types of signal paths. A crossing slash "/" denotes that there are typically multiple paths running in parallel (e.g. multiple DQ links), and carrying generally contemporaneous signals. The clock distribution tree ensures that the same transmission or sampling timing edge occurs for each of these signals at substantially the same time, which might not be the case if clock distribution didn't distribute signals in a manner that was balanced. In this embodiment, memory timing is sent to the controller for comparison and feedback and, for this purpose, the same timing signal ($\Phi_{md}$) is also transmitted to the memory controller as a clock-to-master, or "CTM" signal having its own set of pins 312. The CTM signal may represent any form of timing, including a clock or strobe signal as pertinent to the design.

The memory controller 305 performs feedback by receiving the CTM signal and then using it for comparison. The generation of a signal that represents memory timing based on the CTM signal is performed by a phase-locked loop, or PLL, 313, which then distributes the memory timing signal within the controller using another clock distribution tree, 315. Alternatives exist for these methods of determining memory timing, for example, the system may use a clock data recovery ("CDR") system, in which a dedicated CTM signal is not used, but where instead memory timing is embedded in transitions of one or more signals sent along the bus (DQ/CA/DM) and then recovered by the controller. The optional use of encoding of signals by the memory device to achieve this result, and of CDR by the controller, is represented by dashed line processes 316 and 317, respectively (the PLL, 313, would typically be part of the CDR circuit in this case). The clock distribution tree 315 distributes the memory timing signal to samplers 319 for receiving signals sent to the memory controller from the memory device along path DQ/CA/DM, to transmitters 321 for sending signals sent to the memory device along paths DQ/CA/DM, and to a compare circuit 323 for purposes of providing the feedback. In some embodiments samplers 319 may be composed of both data-clocked and edge-clocked samplers in order to determine early/late information in a 'bang-bang' style manner. If desired, the clock distribution tree 315 may introduce calibrated phase offsets, such that each sampler and transmitter is edge timed so as to sample or transmit signals (as appropriate) in a manner that will match the timing of the memory IO (accounting for transmission time and other sources of phase delay). Numeral 325 in FIG. 3 represents a controller interface having multiple transceivers, including pairs of samplers/receivers and transmit circuits for each bidirectional link coupling the memory device and memory controller, as appropriate; while FIG. 3 depicts one such pair, it should be appreciated that there can be a number of these in parallel, e.g., one for each DQ link for example. In some embodiments, this arrangement is performed just for the data links, while CA and DM links are run at a slower frequency rate; in other embodiments, the CA links and the DM links (if employed by the application) are run at the data link bitrate.

The memory timing is used by the memory controller to synchronize the sending of at least some signals to, and receipt of at least some signals from, the memory device, but the memory controller for the most part runs on its own timing (which may be of a different phase and frequency than the memory timing). To assist with data transfers, therefore, memory controller also has a timing domain crossing circuit, 327, which transfers signals between the controller interface 325 and a controller core 329. The controller core routes data and commands between the memory device 303 and a CPU, as indicated by numeral 331. In addition, the controller core performs calibrations and general management of memory operations, including the function of regulating memory timing through feedback. To this effect, the compare circuit 323 compares a representation of current memory timing ($\Phi_{md}$) against a reference ("ref"). This reference may be a locally generated clock signal or, for example, a reference generated based on a programmable value (represented by the contents of a register 333). If desired, and as indicated by dashed line input 335, a programmable value reference may be obtained from an external source, for example, a lookup table, a hard-wired value, a value obtained from a memory register, a value stored in a module serial presence detect ("SPD") register, or from another source. In many of the embodiments presented below, a suitable reference can be a controller clock, also labeled ($\Phi_{co}$). Irrespective of reference choice, comparison results may then be provided to control logic 337, which then works with the controller core 329 to send commands to the memory device to adjust memory timing upward or downward, as appropriate to the embodiment.

As for the memory device (or other slave device), it receives signals along DQ/CA/DM links as appropriate using an IO interface 339, which may have one or more transceivers, each having a transmitter 341, a sampler/receiver 343, or both, for each link as appropriate. Each transceiver is timed based on the memory timing ($\Phi_{md}$) received from the memory device's clock distribution tree 311. Command and address information, and mask data (if masking is used for the particular embodiment) are sent to memory command logic 345, which accordingly routes data to the memory core 347, activating core access circuitry (e.g., row and column access circuitry, and associated timing and selection signals) as appropriate. The memory command logic 345 also routes commands to adjust-up or down memory timing to the memory register 309, which then controls the voltage regulator 310 to generate the analog voltage used to control the VCO and thus adjust the memory timing ($\Phi_{md}$) in dependence upon contents of the memory register 309. In this way, the memory controller may, using feedback provided by measuring memory timing and comparing it to a reference, and responsive issuance of commands to memory, programmatically adjust the frequency of memory device timing in dependence upon the comparison.

Notably, in the embodiment of FIG. 3, command and address signals are also depicted as dependent on memory device timing (used to drive the controller's transceivers), but this need not be the case. For example, in one embodiment discussed below, command and address functions are routed via a dedicated CA bus run at slower rate than a dedicated DQ bus—in such an embodiment, more flexibility exists as to the precise transmit phase utilized by a controller for such signals. Also, it should be noted that the memory device in this embodiment does not receive an independent (external) timing signal, i.e., the VCO 307 is a self-contained oscillator circuit, for example, based on a ring-oscillator design.

Figure 4:
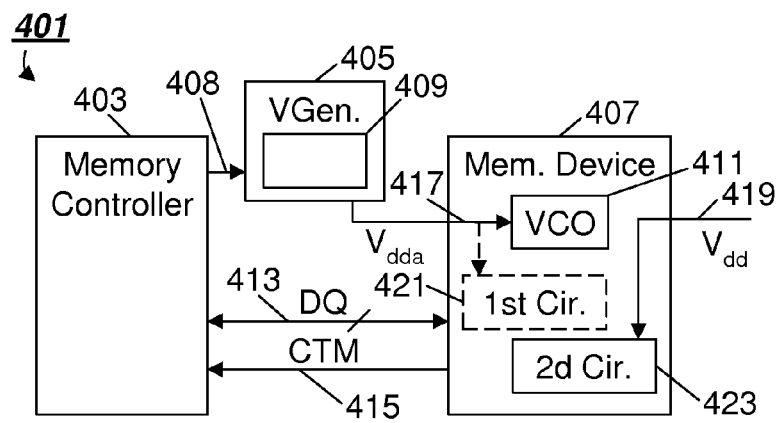
FIG. 4 shows another system embodiment 401, in which a slave device, such as a memory device has a VCO 411, and the voltage used to control the VCO is generated off-chip or off-circuit from the memory device.

FIG. 4 presents a variant on the basic design of the system just discussed; in particular, FIG. 4 presents an embodiment 401 having a memory controller 403, an external chip 405 (used for purposes of adjusting memory timing) and a memory device 407. In this particular example, the memory controller uses a dedicated link 408 to control the adjustment of a VCO control voltage ($V_{dda}$) provided to the memory device, by programming a register or other storage element 409. That is, unlike previous embodiments, the register or other storage element in FIG. 4 is located on an external chip, such as an external voltage regulator 405. As was the case with the previous discussion, each of these elements (memory controller 403, external chip 405 and memory device 407) may be standalone integrated circuits, single die or otherwise. The VCO control ($V_{dda}$) applied by the memory device is used to vary memory device data rate and timing through control of VCO 411, with DQ links and a CTM signal 413 and 415, respectively, carrying data and timing to the controller. The embodiment of FIG. 4 is not limited to the use of a VCO, i.e., it is possible to have some other form of programmable oscillator, where the oscillation control is stored on the external chip, and the oscillation source itself is resident on the memory device 407.

Apart from illustrating the use of a standalone voltage generator, FIG. 4 is also used to introduce power scaling characteristics that may be used for some embodiments. As mentioned earlier it is well known that for CMOS logic, switching power is expended according to the equation of $$P=CV^2F$$

where "C" refers to capacitance, "V" refers to voltage and "F" refers to frequency. As introduced by FIG. 4, variation in IO frequency down to a minimum desired bitrate is used to provide power savings relative to the conventional approach of "overdesign" and "running $V_{dd}$ too hot" for some memory parts (i.e., all but the slowest parts produced according to a specific design and associated tolerances). In some embodiments, the reference voltage provided to circuitry (other than the VCO) can also be scaled somewhat to provide further power savings, potentially even more significant than frequency adjustment (i.e., given the squared relationship voltage variation bears to power consumption). In this regard, FIG. 4 illustrates use of (i) a second power supply (i.e., a second supply voltage, $V_{dd}$, i.e., in addition to an adjustable supply voltage $V_{dda}$), (ii) optional first circuitry 421 controlled using the scaled voltage ($V_{dda}$), and (iii) second circuitry 423 that uses an unscaled supply voltage. Notably, IO circuitry performance is often sensitive to the supply voltage in a similar manner as the VCO, and tying this voltage supply to $V_{dda}$ permits simultaneous scaling of IO circuitry power dependent on the VCO frequency. The first circuitry 421 is illustrated in dashed lines as optional, because in some embodiments, frequency adjustment only is used without separate voltage adjustment of non-clock circuits. For basic scaling of operational circuitry, that is, where some circuitry has its voltage scaled, it is expected that the first circuitry may include IO interface circuitry and column access circuitry, whereas the second (unscaled) circuitry may include row access circuitry, memory core voltages used for read, write and refresh (in the case of DRAM), and logic circuitry. There are other embodiments for power scaling, however, and these will be discussed further below.

A. Memory Timing Adjustment.

In the FIGS. discussed below, a number of system-based options will be introduced. The discussion of these options will provide additional detail regarding how memory timing may be compared against a reference.

First, however, in order to understand relative advantages in terms of different adjustment techniques, a basic understanding of one multi-memory device system will be presented. In the discussion below, a system will first be discussed where each one of multiple memory devices is independently adjusted such that the $V_{dda}$ of each memory device is tuned to obtain a target bitrate (or other desired value). Additional techniques for timing comparison and adjustment will then be discussed. Following this discussion, implementation of other systems will be presented, including a system where all memory devices are adjusted together, with one programmatic value, and where chip-to-chip silicon variations will cause the system to be pleisiochronous.

Figure 5:
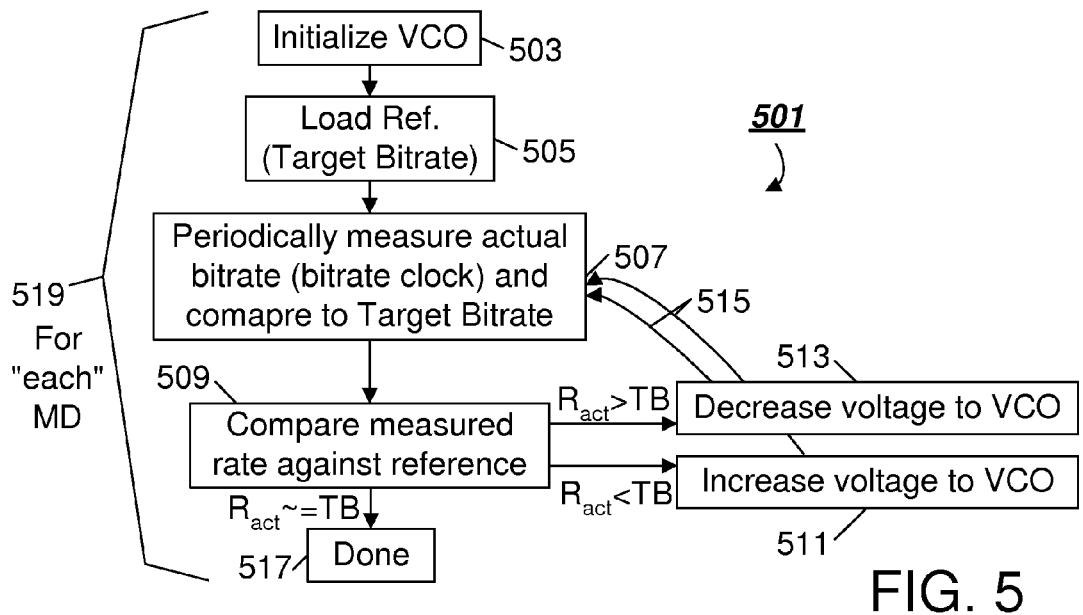
FIG. 5 provides a flowchart for another method 501, used for a system having one or more slave devices, e.g., memory devices. In the method of FIG. 5, a VCO for each memory device is adjusted against a reference so that a target bitrate ("TB") is achieved.

FIG. 5 provides flow for another method 501, used for a system having one or more memory devices. In the method of FIG. 5, a VCO or other programmable oscillator for each memory device is adjusted against a reference so that a target bitrate ("TB") is achieved. For example, it should be assumed for purposes of FIG. 5 that a memory system (not depicted in FIG. 5) includes a controller, two different memory devices (e.g., DRAMs), with each DRAM having its own dedicated VCO and a dedicated voltage control used to adjust the VCO (this control may be generated on the DRAM or outside of the DRAM and supplied to the DRAM, as previously discussed).

To adjust each DRAM, the on-board VCO can first be initialized to a minimum value (e.g., using the memory controller to "zero" the register used to set the VCO control voltage), as indicated by process 503. At about the same time, the memory controller retrieves its reference that it will use as a comparison benchmark, in this case a target minimum bitrate, per process 505. In some implementations, a controller clock may be directly used as this reference. The controller then proceeds to measure memory timing, per numeral 507. As alluded to by the notation "periodically" in process block 507, this comparison may not only be done at power up, but may be performed during run-time to compensate memory timing fluctuations caused by temperature changes in the specific memory device or voltage changes in other components in the path, a form of "drift." As indicated by process block 509, for each measurement, the value obtained during process 507 is compared against the reference obtained from process 503. The comparison may determine whether any particular states or conditions exist, but in this example, is seen to determine whether one of three states exist, i.e., whether the measured timing ("$R_{act}$") is significantly greater than the reference retrieved during process 503, whether the measured timing is significantly less than the reference, or whether the reference is approximately equal to the reference. The equality relationship can be relatively precise (e.g., minimized difference compared against reference, determined from multiple different VCO measurements) or approximate (equality satisfied within a range about the reference) depending upon embodiment. If the measured timing is too slow, as indicated by process 511, then the VCO control voltage can be increased; if too fast as indicated by process 513, then the VCO control voltage can be decreased. The system can then proceed to take revised measurements and repeat the memory timing measurement and comparison processes, as represented by feedback loop 515. Clearly, a number of options exist for the precise comparison methodology, depending on embodiment; for some embodiments, it may be simply sufficient to detect a minimum difference between actual memory timing and the reference, and then simply use that value without proceeding with further measurements. Irrespective of the particular option applied, once the memory timing is matched to the target minimum bitrate, the adjustment process ends for the particular memory device, as indicated by process 517.

As alluded to by numeral 519, the method just described can be repeated for each memory device in the system (e.g., each of two memory devices in the hypothetical being discussed). Each memory device can thus be independently adjusted to tune its own unique bitrate to a common bitrate used for the entire system (e.g., dictated by memory device specifications, dictated by a controller clock or another suitable source for one or multiple references). The method of FIG. 5 may thus be used to implement a mesochronous system, that is, where all integrated circuits in a system operated according to the same clock frequency but with arbitrary phase; to achieve this end, the reference used by the memory controller can be a single target bitrate used by all memory devices in the system, e.g., 4.00 gigahertz, such that each memory device may have different programmed numbers for VCO control, used to adjust each device's VCO, but with the VCOs all controlled using feedback so as to hone their generated frequencies to a common value. Again, this design can be applied to help relax memory design standards as all devices (including FF and SS devices) can be tuned to a specific frequency irrespective of overdesign of the various "corners" of their clock supply and distribution networks. If desired, the methodology seen in of FIG. 5 may also be applied to a pleisiochronous embodiment, one implementation of which will be further discussed below.

B. Comparison of Memory Timing with a Reference.

Comparison of memory timing against a reference may be accomplished using a simple phase detector (e.g., based on a bang-bang or "Alexander" phase detector) or a frequency counter (e.g., by counting the number of cycles of a first clock during a fixed number of cycles of a second clock). While many suitable comparison mechanisms exist, FIGS. 6 and 7 are used to present two specific additional comparison circuits that may be suitable for some embodiments.

Figure 6:
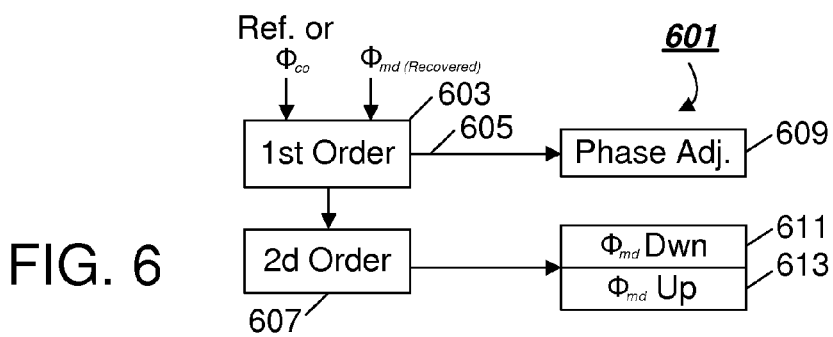
FIG. 6 provides an example of a comparison circuit 601 that is an alternative to the general comparison circuit in earlier embodiments. In particular, feedback for programmatic control is obtained using a second order timing comparison circuit.

FIG. 6 provides an example of one such alternative comparison circuit 601. In particular, VCO control is obtained using a second order timing comparison circuit (e.g., second order clock recovery circuit), where a first order "digital" phase comparison circuit 603 compares a controller clock (or other reference, "Ref or $\Phi_{co}$") with a recovered memory clock (e.g., clock, bitrate or other timing indicator, "$\Phi_{md}$") and generates a signal 605 used to "digitally" adjust phase, such that a memory controller reduces phase delay between a controller clock and memory timing, so that it can transmit command, address, data or mask signals with built-in delay, timed to arrive at a memory device at "exactly the right time" relative to the memory clock, and so also that it can sample data at the time of maximum bit symbol eye opening. The circuit 601 also includes a second order frequency adjustment circuit 607 that generates signals used by the controller to programmatically-adjust the memory system clock so as to obtain the desired frequency (e.g., such as a specific target bitrate). That is to say, the first order loop is designed so as to compensate for phase difference between two signals of like frequency (represented by process 609), whereas the second order loop is used when the first order phase loop can't keep up—signals generated by the second order loop are then used to adjust memory clock frequency so that the memory timing moves up or down relative to a reference, as indicated by process blocks 611 and 613. The example of FIG. 6 may be especially useful where a memory system is designed to tune timing of each memory device to a memory controller clock. As implied, if CDR is used, the memory timing ("$\Phi_{md}$" in this example) can be based on the actual bitrate of memory transmissions.

Figure 7:
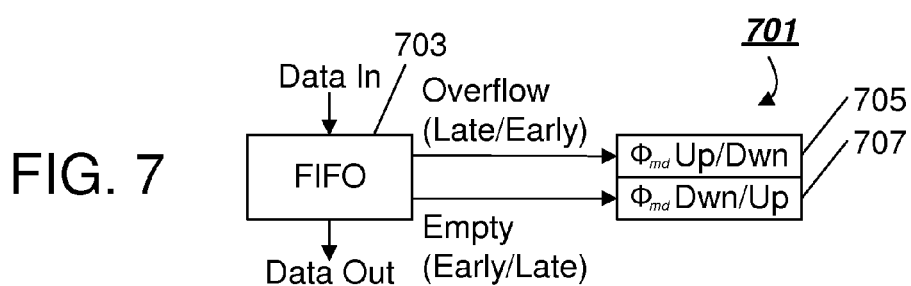
FIG. 7 provides an example of another alternative comparison circuit 701, namely, one based on monitoring occupancy of a first-in first-out communication buffer ("FIFO") 703.

FIG. 7 provides an example of another alternative comparison circuit 701, namely, one based on the use of a first-in first-out communication buffer ("FIFO") 703. The FIFO is used to transfer communications between a controller clock domain and a memory clock domain with data being loaded into the FIFO by one of these clocks and emptied by another. Thus, memory timing as measured by the memory controller may be used to load or unload the FIFO (depending on data direction) while the controller clock may be used to unload or load the FIFO. For example, if the FIFO is used as part of a serial transmission path used to send data to a memory device, the memory controller clock would be used to load data into the FIFO, and memory timing measured by the controller used to unload the data from the FIFO. Similarly, if the particular FIFO used for memory timing adjustment was used as part of a controller's serial receive transmission path, the memory timing would be used to load the FIFO, with the memory controller clock unloading the FIFO. The memory timing may be provided to the memory controller as has been previously described, e.g., based on a dedicated memory timing signal, via a clock recovered from one or more communication links (CDR), or via another method. The memory controller uses the comparison circuit 701 to maintain "just the right" balance between the memory timing and the memory controller clock, i.e., if the FIFO used to send data to the memory device runs empty or begins to run empty, then the memory timing is too fast (i.e., it unloads data too fast for the memory controller clock to keep up); similarly, if the FIFO used to send data to the memory device overflows or begins to overflow, the memory timing isn't fast enough, and is therefore adjusted upward. In some embodiments, two FIFOs may be used together, e.g., one for each data direction, with the memory controller monitoring each of these to continuously adjust memory timing (e.g., serial transmission is typically performed only in one direction at a time over a given link). The use of overflow and empty signals to adjust memory timing upward and downward is indicated by reference numerals 705 and 707.

IV. SPECIFIC MEMORY SYSTEM CONFIGURATIONS

With a number of timing measurement and comparison options thus introduced, a number of specific system implementations will now be discussed.

Figure 8:
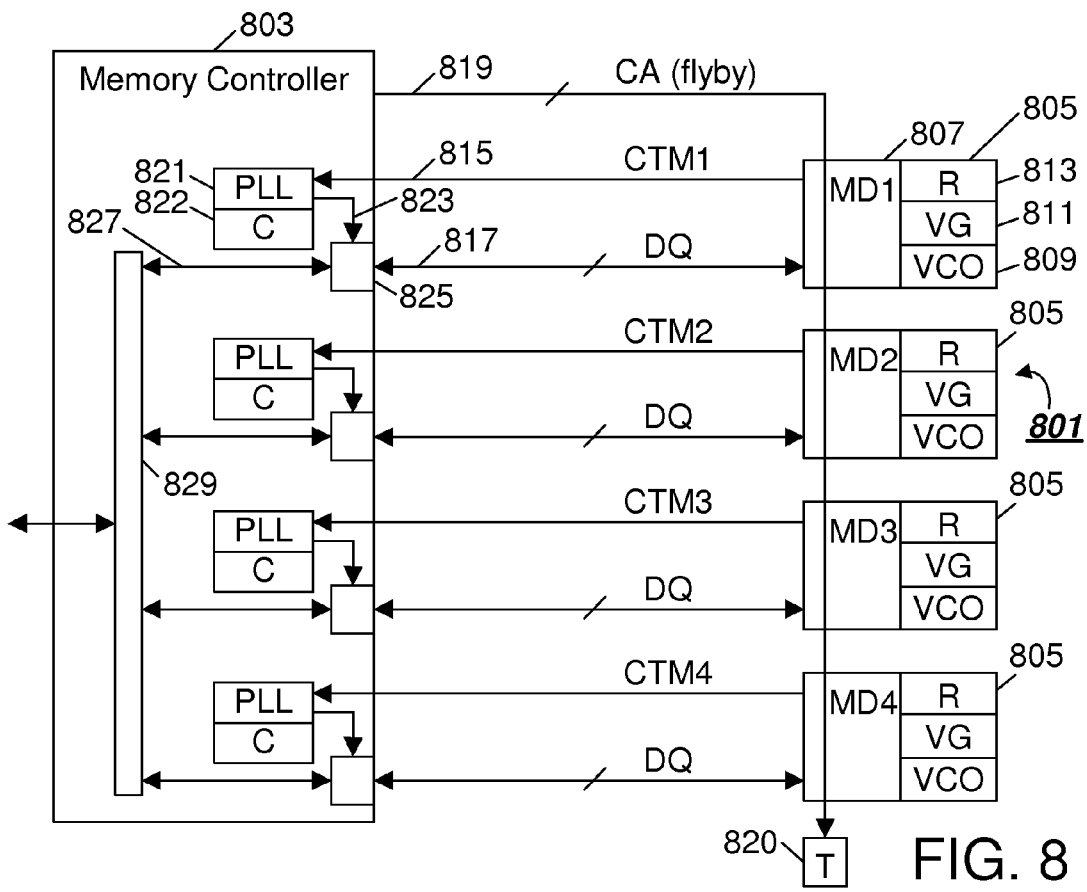
FIG. 8 provides another exemplary memory system embodiment 801, in which a memory controller 803 communicates with multiple memory devices 805 using point-to-point data communications (i.e., links labeled "DQ") and a "fly-by" command and address ("CA") bus that is run at a slower rate than the data communications. The memory devices each have their own "on board" register, voltage generator and VCO, and each memory device sends its own CTM signal to the memory controller.

FIG. 8 provides a memory system 801 that uses a point-to-point ("P2P") configuration for data communications and a "fly-by" architecture for command and address signals. The system includes a memory controller 803 and plural memory devices 805, with four memory devices shown in the example of FIG. 5. A first one of the memory devices 807 is shown in enlarged detail, but it should be understood for this example that each memory device is identical in design, i.e., the enlarged detail is shown for only one device so as to facilitate understanding of how the memory devices are designed. Each memory device, as has been previously introduced, includes a VCO 809, a voltage generator ("VG") 811 and an on-board register 813 used by the controller to programmatically-control memory timing of the specific memory device (each of the other memory devices 805 has a box "R" to indicate that it also has this circuitry and its own dedicated register).

Each memory device 805 is connected by its own dedicated clock-to-master ("CTM") signal to the memory controller and its own dedicated set of bidirectional DQ links 817 coupled to the controller. The DQ links may effectuate a parallel transmission scheme in this example, e.g., each memory device 805 may carry a portion of a memory word, for example, via sixteen DQ links, such that there are a total of sixty-four parallel links. In this example, the DQ links may be run at a high speed (e.g., a target bitrate for data communications) while command and address signals may be run at a slower rate (e.g., ¼ of the target bitrate for data communications). The data links each directly couple only one memory device with the controller (to minimize phase offsets and intersymbol interference, or "ISI"), while the wider timing used for command and address ("CA") signals permits the CA bus 819 to be routed to multiple memory devices along its length. As indicated above, with the last memory device along the length of the CA bus (e.g., at memory device "MD4"), the bus is terminated by a suitable impedance network adjustment as indicated by box 820.

For its part, the memory controller 803 uses a phase lock loop ("PLL") 821 for the CTM signal from each memory device to precisely time the sampling interval for that memory device (to simplify discussion, only timing circuitry used to communicate with the first memory device, 807, is numbered on the memory controller side of FIG. 8, but this circuitry and the applicability of the discussion should be understood to be identical for each memory device). That is, the controller has several separate timing circuits, one for each memory device, with each of these including a comparison circuit 822 to provide a suitable mechanism for adjusting the register "R" of each memory device, and so to "tune" memory timing in a desired manner. The timing output signal 823 of the PLL for each of the four memory devices is fed to a corresponding set of samplers and transmission circuits 825 (e.g., a controller interface including a sampler and transmission circuit for each one of the sixteen DQ for each memory device in this example) and used to precisely time communication exchange with the corresponding memory device. Although not separately depicted in FIG. 8, as mentioned earlier, the memory controller may also employ phase alignment circuitry, separately for each of transmit and receive circuits, to ensure communications are exchanged with the memory device using the proper timing. Calibration techniques used to adjust phase in this manner are conventional and are outside of the scope of this disclosure. Within the controller domain, communications with each memory device are then aligned to a single clock domain and are combined into a single wide data word (e.g., sixty-four bits wide), as represented by numerals 827 and 829 in FIG. 8.

The embodiment of FIG. 8 may also, if desired, be used to implement a mesochronous system per the method of FIG. 5. That is to say, with a P2P system in which each memory device is arranged so as to store a different subset of a data word, each memory device is preferably timed so as to operate at the same basic frequency, and thus each comparison circuit 822 (also labeled "C" in FIG. 8) is used to independently adjust the corresponding register 813 (also labeled "R" for each of memory devices MD1-MD4) so that the VCOs 809 of each of memory devices MD1-MD4 all generate the very same frequency. Again, this structure may be used to tune each memory device notwithstanding silicon processing variations that might cause the transistors and signal paths of one device to be "faster" or "slower" than other devices and, thus, the programmed value for each memory device may differ. In an alternate embodiment which would facilitate pleisiochronous operation of the memory devices in this configuration, the CA flyby signals may be accompanied by their own source-synchronous clock signal.

Figure 9:
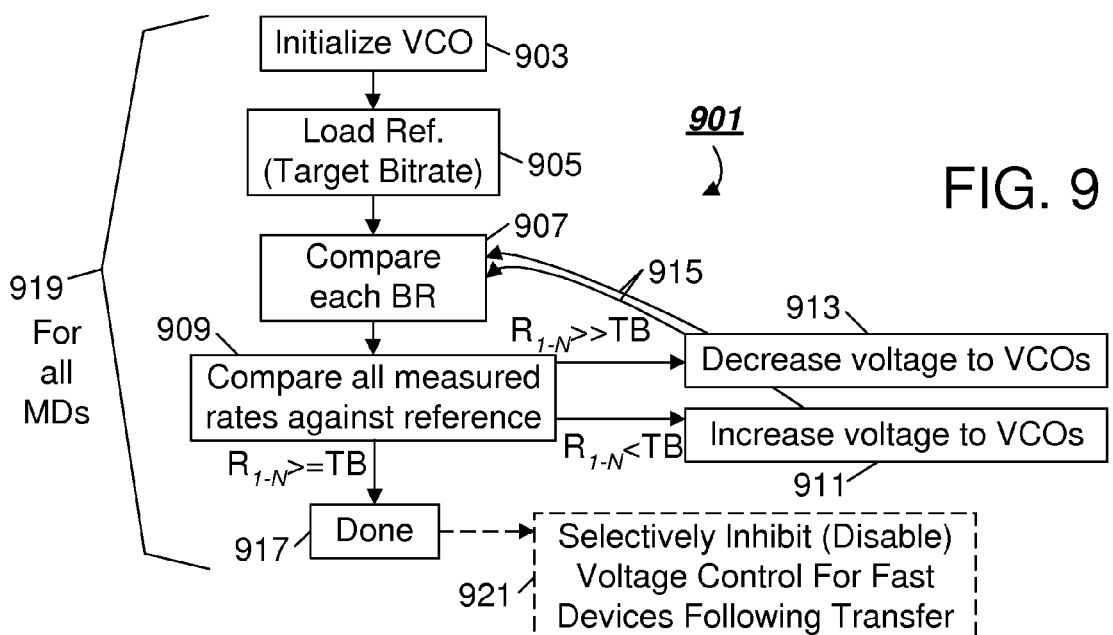
FIG. 9 provides a flowchart 901 for another method, where multiple memory devices are all adjusted together based on the same programmed value; in this example, the programmed value is increased such that all devices operate at greater than or equal to the target bitrate, i.e., the memory devices can be adjusted as a unit until the slowest device operates at approximately the target bitrate.

FIG. 9 shows a method 901 where multiple memory devices are all programmed to the same value, which typically results in each memory device having a different oscillation frequency. The method of FIG. 9 may be advantageous to a wide variety of memory systems, not the least of which is a module based system (which will be further discussed below). Two embodiments may be kept in mind in discussing the method of FIG. 9, including a first embodiment where each memory device has a programmable register, voltage generator and VCO dedicated to it, and a second embodiment where each memory device has a VCO, but where a programmable register and voltage generator are shared across memory devices. As before, for purposes of this discussion, each device may be an integrated circuit, a module, or another type of memory device.

Initially, the one or more VCOs may be initialized, e.g., each set to a minimum value, as indicated by process 903, via one or multiple VCO calibration loops. The reference used by the memory controller as a benchmark is then retrieved, per block 905, and the memory controller then begins applying measured "actual" memory device timing against the benchmark, per numeral 907. Unlike the embodiment discussed earlier, however, in FIG. 9, the memory controller does not separately set "each" memory device to have timing close to the benchmark (e.g., minimum specified bitrate) but instead, loads or decreases the programmed value(s) for every memory device in common until the benchmark is exceeded for all memory devices. That is to say, the method finds the first value where all memory device timing exceeds the specification (i.e., where the last "slowest" memory device becomes just fast enough to exceed the specification, even if other memory devices are operating significantly faster than this "slowest" device). These functions are variously representing in FIG. 9 by numerals 909, 911, 913, 915, 917 and 919.

The methodology depicted in FIG. 9 can be implemented in a number of ways; for example, as described above, timing is zeroed and then incremented slowly, in parallel for all memory devices. The process can also be performed in multiple loops, one for each memory device, to find the smallest "common" program value where the slowest memory device "just" meets the target bitrate. In other methods, the VCO may be initially maximized and then decremented. Many other techniques also exist.

Several advantages are offered by the embodiment of FIG. 9; first, the method 901 may be implemented with reduced circuitry, e.g., a single register or other storage element, and a single voltage generator, as appropriate, may be used for multiple memory devices, advantageous if it is desired to use an external voltage generator (e.g., separate from multiple memory devices) that generates only a small number of adjustable voltages. This methodology may also be advantageous in module-based embodiments, e.g., where a single voltage generator is used to throttle timing up or down for several memory ICs on a memory module (e.g., 4-8, or conceivably more ICs). Finally, as alluded to earlier, use of this embodiment may provide the occasion for additional power savings, as represented by optional (dashed line) block 921. That is to say, it will be recalled that greater CMOS power savings may be obtained (for operational circuitry) by scaling voltage as opposed to just operating frequency; for the embodiment of FIG. 9, memory devices that operate "faster" than the slowest memory device may have their IO circuitry or at least their high-speed clocks turned "off" when done with communication, thereby saving power. This feature will be further discussed below, in connection with FIGS. 11-16.

Figure 10:
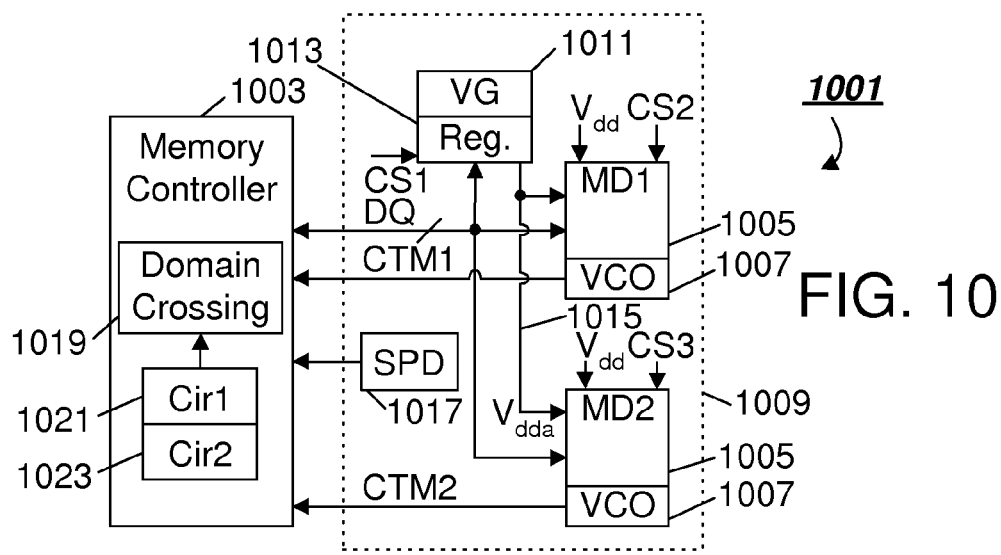
FIG. 10 shows another memory system embodiment 1001, where the controller programs a voltage regulator to set a common reference voltage ("$V_{dda}$," to adjust the oscillator of all memory devices together, per the method of FIG. 9). This embodiment may optionally be implemented using a memory module, as referenced by dotted line 1009. A separate voltage input "$V_{dd}$" may also be used for each memory device, to detach adjustable VCO control voltage for each memory device from the regular memory device power supply.

FIG. 10 illustrates an embodiment 1001 that can be used to implement another memory system. As with the embodiments discussed earlier, FIG. 10 shows a memory controller 1003 and plural memory devices 1005, each having their own VCO 1007. The memory devices may be discrete modules, multiple integrated circuits ("ICs"), or other types of memory devices; for example, they may be several ICs mounted on a single module (represented by dotted line 1009). The embodiment also includes an external voltage generator ("VG") 1011, which includes an on-board register set by the memory controller to program a control voltage that will be used to drive the VCO of each memory device; for this purpose, the voltage generator provides a control voltage reference (labeled "$V_{dda}$") that is distributed to each memory device for purpose of driving all of the VCOs 1007 in parallel. In some embodiments $V_{dda}$ is also used to drive some, most, or all of the logic in the interface of the memory device. Note that each memory device in this example also receives a standard unscaled reference voltage ("$V_{dd}$"), for purposes that will be explained below. As with the embodiments mentioned above, each memory device provides a CTM signal for purpose of measuring the actual timing employed by the specific memory device. FIG. 10 is also notable in that it shows a "multidrop" layout, that is, where the data bus (represented by lines "DQ") couple the memory controller 1003 with multiple destinations (e.g., the voltage regulator 1011 and each memory device MD1-MD2). In this embodiment, each of these devices discriminates communications intended for it through the use of a dedicated chip select signal (labeled "CS1-CS3" respectively).

Notably, FIG. 10 also shows the use of two additional features. First, the module 1009 is seen to include a serial presence detect register (or "SPD") 1017, which can be used by a manufacturer to store a minimum bitrate or other information pertinent to the particular module; in the context of this discussion, the SPD may be used to store a minimum bitrate which can then be retrieved by the controller as its benchmark, i.e., to provide a benchmark against which memory timing is tuned. Second, the memory controller 1003 is also seen to include a domain crossing circuit 1019 and two circuits 1021 and 1023, each of which may be used to store frequency and/or phase information for a corresponding memory device. That is to say, in a multi-frequency system, these circuits may be used by the domain crossing circuit to quickly substitute in timing for whichever memory device is being addressed, to permit the domain crossing circuit to switch between timing signals from multiple, alternate clock domains. In one embodiment, these circuits can be registers used to store phase and frequency information, and in another embodiment, these circuits can be configured as PLLs, one each continuously locked to a CTM signal (CTM1 or CTM2) from a corresponding memory device.

Figure 11:
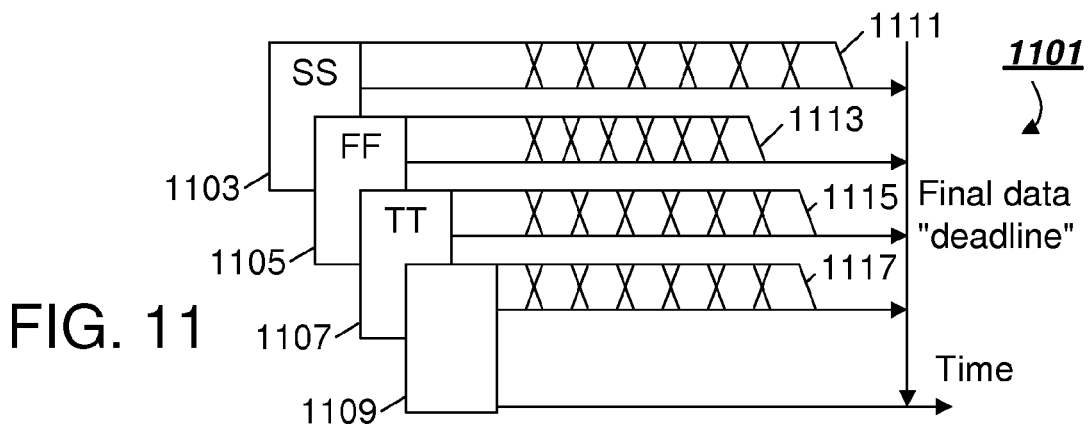
FIG. 11 shows a comparative timing diagram 1101. As indicated by timing patterns (1111, 1113, 1115 and 1117) of six serial bits transmitted by the respective memory devices, devices other than the SS device 1103 "finish early" and may be partially or fully stopped or powered down to save power following communication.

FIG. 11 provides a graph 1101 used to explain how memory device relative timing may be leveraged to generate power savings in a multi-frequency system where each device receives the same control voltage, but where multiple memory devices are simultaneously activated and each memory device returns a portion of the requested data. At the left side of FIG. 11, four memory devices are illustrated 1103, 1105, 1107 and 1109, with the first memory device being labeled "SS," denoting that it is a "slow-slow" part and has one or more slow corners in its timing distribution path. That is to say, given silicon processing variations and manufacturing tolerances for the design in question, the first memory device operates more slowly than it is supposed to, as represented by numeral 1111. A data pattern consisting of six bits from each memory device (and associated bit cells) is illustrated at the right side of FIG. 11 and, as depicted for the slow-slow device, the six bits take "almost" all of the time available up to a final data "deadline" (that is, when the memory device may be required to finish transmitting or receiving different data). Contrasted with the slow-slow part, the next memory device 1105 is labeled "FF" as being a fast-fast part; the second memory device operates faster than is typical for the given design, again due to silicon processing variations, and its transmit timing of the same six bits and associated eye patterns is marked by numeral 1113. As depicted, these bits are transmitted more quickly than was the case for the slow-slow device; this is to be expected as its VCO has the same control voltage as the slow-slow device and yet its manufacturing corner runs faster with the same control. This device, then, leaves a healthy margin of free time before the final data deadline. Memory device 1107 is marked "TT" for typical-typical, representing that its timing corresponds to average timing for acceptable parts for the memory device design in question, and its timing is represented by numeral 1115. Finally, the fourth memory device 1109 is unlabled, and its transmit pattern 1117 is seen to be between that of the FF and SS parts. Thus, of the various depicted memory devices 1103-1109 in a multi-frequency system, the slowest memory device can be adjusted to "just" meet timing while faster devices (if adjusted in common with the slowest device) leave additional free time available with each memory transmission. During this free time the high-speed clocks of these devices can be shut-down, eliminating the most significant component of switching power. If desired, some additional circuitry of these faster devices can be turned "off" during this time to thereby provide further power savings.

Figure 12:
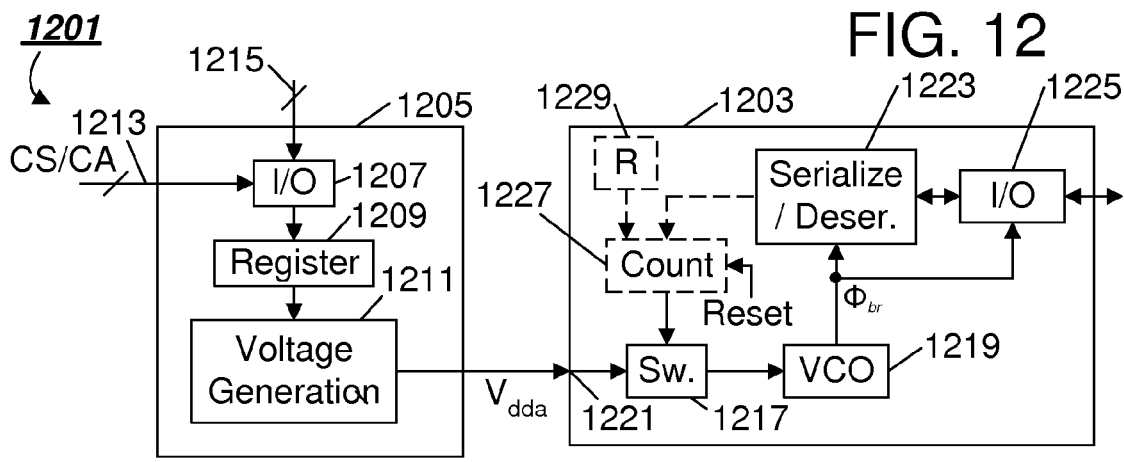
FIG. 12 provides a diagram of an exemplary circuit 1201 that helps illustrate use of the power-down processes just referred to. A memory device 1203 includes a switch 1217 that can be activated to cut off voltage to its VCO 1219, thereby stopping the memory device clock.

FIG. 12 provides an embodiment 1201 that may be used for this purpose, by effectively turning off the VCO control voltage to turn off timing (e.g., to freeze the internal clock) for "fast" memory devices. FIG. 12 depicts a memory device 1203 and an external voltage generator 1205, the latter providing a VCO control voltage ("$V_{dda}$") used to control memory device timing. As with previous embodiments, the VCO control voltage ("$V_{dda}$") is defined by controller programming and, to this effect, the voltage generator 1205 includes an IO circuit 1207, a programmable register 1209 and a voltage generation circuit 1211. The memory controller (not shown in FIG. 12) utilizes one or more control and data signals (labeled as part of the bus CS/CA 1213 and DQ bus 1215 in this example) to effect programming.

To take advantage of potential power savings, the memory device includes a switch 1217 that couples its VCO 1219 with an input signal pin for the adjustable control voltage ("$V_{dda}$"). By selectively enabling and disabling this switch, the memory device may quickly "freeze" its clock without having to take time to recalibrate or ramp up its clock, represented by symbol $\Phi_{br}$ (bitrate clock). The bitrate clock can be distributed to a serialization/deserialization pipeline and IO circuitry, represented by numerals 1223 and 1225, for controlling both transmit timing and receive timing for the memory device.

The switch 1217 can be controlled using a number of different methodologies suitable to the design. In FIG. 12, one option is presented by the use of a count circuit 1227 and a programmable register 1229, the intent being that the count register counts up to a predetermined value, represented by the register contents, and then shuts off the memory clock $\Phi_{br}$ by turning off the VCO control voltage. While the register can be programmed to any value, it may be desirable to set the count value based on serial word length. For example, if the memory device is to serially transmit a word of eight bits and then have its clock shut off until reactivated, the register could be programmed to the value "9," indicating that after 8 bits are transmitted, the IO clock is to be shut down on the next clock cycle; the counter would then be reset when an ensuing transaction is required, as determined by memory device control logic (not illustrated in FIG. 12, although illustrated in other FIGS.). Many other designs are also possible, with or without counters, and using different switch control methodologies if desired. Also, the example of a single data rate counting mechanism in the example just presented does not imply the embodiment of FIG. 12 cannot be used with a double data rate or non-serial implementation.

FIG. 13 provides an alternate embodiment 1301 to the depiction in FIG. 12. FIG. 13 also shows a voltage generator 1303 and memory device 1305. In this example, however, the switch 1309 used to shut off VCO control voltage is co-located with control logic 1311 on the voltage generator 1303 (the control logic 1311 should not be confused in this example with memory device control logic, which typically is present on the memory device, but not illustrated in FIG. 13). The embodiment of FIG. 13 may be advantageous for some designs, particular where it may be desired to shut off the IO timing for a group of memory devices en masse, and where it is desired to shut off IO timing in accordance with specific power modes (independent, for example, of any particular memory IO transaction). The use of the low power modes based on this circuitry may be especially useful connection with cell phones, portable computing devices and other forms of low power applications. As with the previous embodiment, FIG. 13 also shows a dedicated power supply pin 1313 to the adjustable power signal ("$V_{dda}$") from voltage generation circuitry 1307, a VCO 1315, and serialization/deserialization and IO circuitry 1317 and 1319. Similarly, the voltage generator 1303 also includes IO circuitry 1321 and an externally programmable register 1323, which respond to the memory controller via a CS/CA bus 1325 and a DQ bus 1327.

FIG. 14 shows one exemplary memory device 1401, in which circuitry other than memory timing can be scaled to further save power. In particular, the memory device includes a VCO 1403 that generates a memory clock signal 1405 (also labeled $\Phi_{br}$, for memory device clock). The memory clock signal in turn is distributed within the memory device to IO circuitry 1407, column access circuitry 1409, row access circuitry 1411, and to the memory core (including sense amplifiers) 1413. The memory device receives two or more reference voltages, represented as including an unscaled reference voltage $V_{dd}$ (also numbered 1415) and an adjustable voltage $V_{dda}$ (1417). More than one adjustable voltage may be supplied to the memory device if desired to achieve more sophisticated power control along the lines mentioned below, but for simplified description, only one is described below. In FIG. 14, certain circuits always receive the same, unscaled reference voltage $V_{dd}$, such as the row access circuitry 1411 and memory core and sense amplifiers 1413. By contrast, circuits which are scalable in terms of voltage (e.g., not highly sensitive to charge leakage, transistor threshold voltages and so forth), such as the memory device IO circuitry 1407 and column access circuitry 1409 are coupled to the adjustable voltage $V_{dda}$. In the example provided, the adjustable voltage used to scale these circuits can be made to be the same voltage as used to drive the VCO, meaning that reduction in memory timing can have a cubed effect in terms of power savings, per the CMOS power equation mentioned above. In some embodiments the entire device may operate from the single scalable supply and other methods may be used to compensate for voltage reduction on row and memory core accesses, or they may simply have reduced margins.

FIG. 14 provides for a number of different power control options. First, as indicated by dashed line optional design, the embodiment may include an inhibit or switch function 1419. This function 1419 may be used to gate supply of control voltage to the VCO 1403, and it may optionally be used to turn off the supply of power to scalable-voltage circuits, per coupling line 1421. Alternatively, the scalable voltage may be directly provided to these circuits, per line 1423, and thus not coupled to the inhibit or switch function 1419. As indicated by numeral 1425, memory device control logic may be used to control the inhibit or switch function in a manner that has been previously described (e.g., this control may be sophisticated, based on a programmable counter and used to turn the VCO off once memory transmissions have been completed, or to some other purpose). Still further, as denoted by numeral 1427, the VCO if desired may be controlled or scaled via a programmable register, which is shown in dashed lines to indicate that if desired, control of memory timing may be detached from $V_{dda}$ and independently driven from the unscaled voltage $V_{dd}$ or from a regulated version of $V_{dd}$. As indicated by numerals 1429 and 1431, in this embodiment as was the case previously, the memory device communicates with a controller (not shown) using at least a DQ bus and a CTM signal, the latter permitting memory timing adjustment using the VCO.

It should be appreciated that depending on embodiment, some, none, or all of the memory device circuitry can be scaled in voltage to achieve some form of power savings, an option especially attractive where it is desired to provide one or more low power modes, for example, in cell phones, portable computing devices, self powered devices, and so forth. Notwithstanding the implication above that it is difficult to scale certain circuits (e.g., DRAM cells, owing to minimum threshold voltages needed for proper operation, and the time dependent decay of memory cell charge in such a design), it is certainly possible that future designs may mitigate these effects, and to the extent this occurs, designers may wish to provide for voltage scaling that includes these difficult-to-scale circuits as well.

FIG. 15 provides a diagram 1501 that helps illustrate the various savings that can be obtained through voltage scaling in different designs. FIG. 15 is generally divided into several "left portions," exemplified by number 1503, and corresponding "right portions," exemplified by number 1505; the left portions and right portions are divided by a vertical line 1507, with the left portion labeled "Scaled (Vdda)" and the right portion labeled "Non-Scaled (Vdd)," at least for a top row 1509. The top row represents a legend, whereas ensuing rows 1511, 1513, 1515, 1517, 1519 and 1521 represent increasing power savings that can be facilitated by making driving further memory circuits using the scaled, as opposed to the non-scaled power supply. Generally, the further one travels down FIG. 15 the more complex the design but the greater the power savings. For example, row 1511 represents a situation where no circuitry is driven by an adjustable voltage (other than perhaps the VCO for some embodiments) while IO, Column Access, Control Logic, Row Access and Memory Core circuitry are all driven by the Non-Scaled (fixed) power supply. In row 1513, the IO interface only is driven by an adjustable voltage; as mentioned earlier, if desired, adjustment can be tied to VCO control. Similarly, the fourth row 1515 represents an embodiment where IO logic and Column Access circuitry are driven by adjustable voltage, while the other circuits are driving using a fixed reference.

Figure 16:
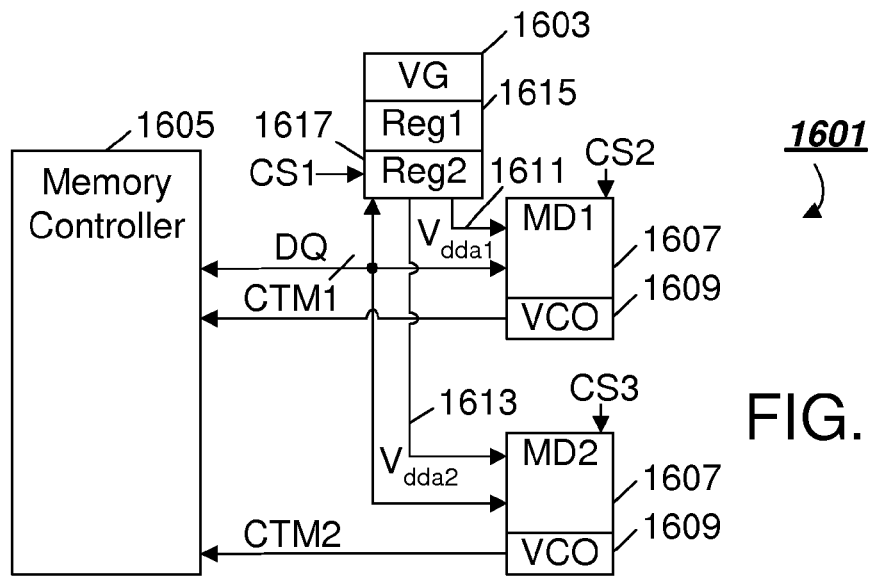
FIG. 16 provides a circuit embodiment similar to the one depicted in FIG. 10, except that an external voltage generator 1603 includes storage elements (such as registers) to control oscillation for each respective memory device (e.g., "$V_{dda1}$" and "$V_{dda2}$"). In this FIG., registers 1615 and 1617 are located inside the voltage generator 1603, but in alternate embodiments they could be contained within the memory controller or another device such as a SPD.

FIG. 16 represents another embodiment 1601, similar to the one seen in FIG. 10, but where an external voltage generator 1603 provides independent voltage control to each of several memory devices. In particular, FIG. 16 shows as before a memory controller 1605, two memory devices 1607 (also labeled "MD1" and "MD2," respectively), and a VCO 1609 for each memory device. However, in this example, the voltage generator 1603 generates two different adjustable voltages 1611 and 1613—these adjustable voltages are also labeled $V_{dda1}$ and $V_{dda2}$ in FIG. 16, and are generated each in dependence upon a corresponding programmable register or other storage element 1615 or 1617, resident on the external voltage generator. As with previous examples, the voltage generator and the two memory devices share a common DQ bus, but receive a dedicated chip select CS1-3 to discriminate controller commands; further, each memory device transmits a dedicated CTM signal to enable memory timing measurement by the controller independently for each memory device. While shown as a multidrop bus, as with other examples, the implementation of FIG. 16 may be practiced with other technologies, for example using a point-to-point (P2P) arrangement, with CA and DM signals (if used) transmitted at bitrate or at a slower rate if desired.

Figure 17:
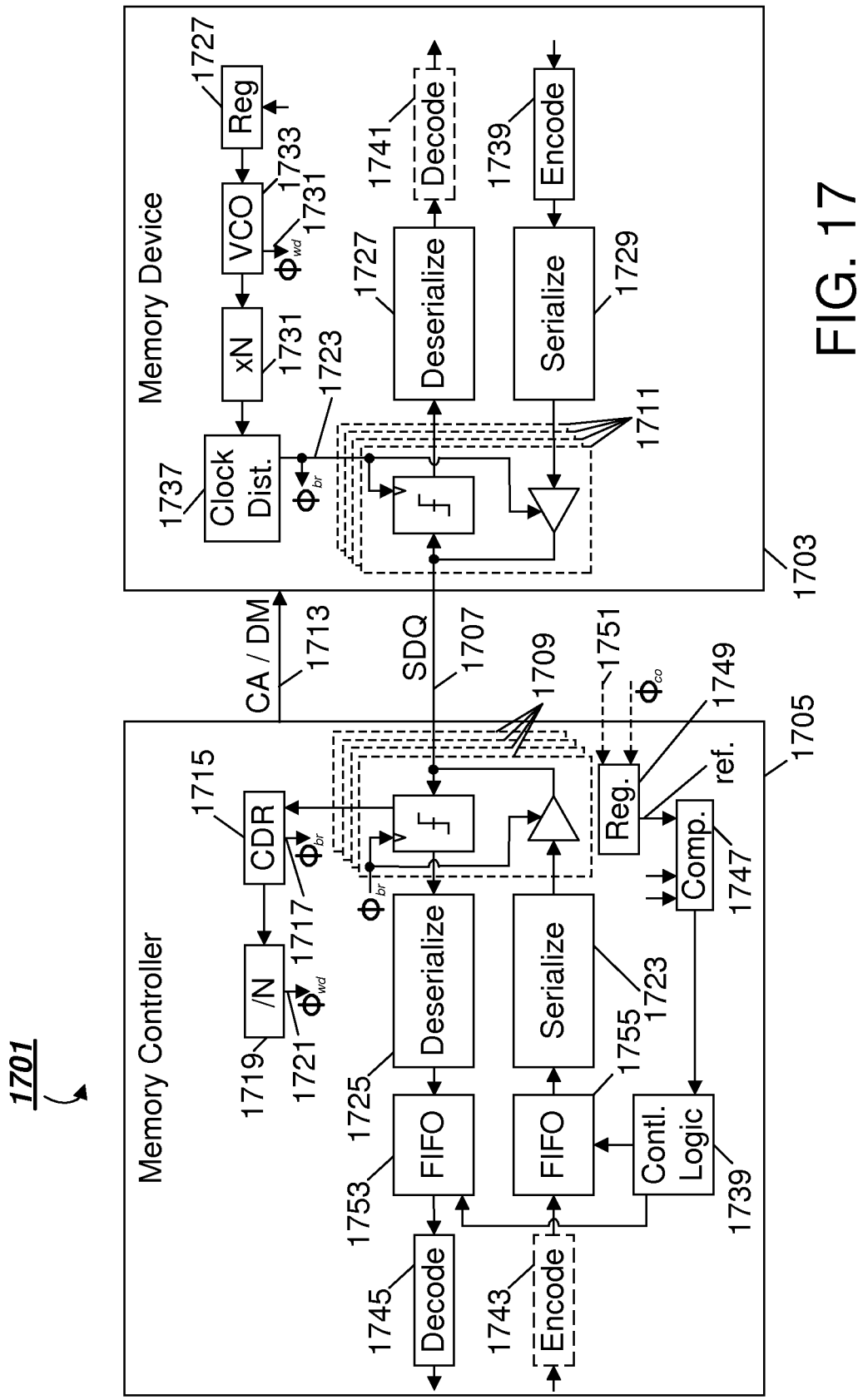
FIG. 17 provides an embodiment 1701 where a memory device and a memory controller communicate using one or more serial data links 1707 (also labeled "SDQ"), with memory device timing information embedded in data transmitted to the controller. Transmissions from the memory device can be encoded (per encoder 1739) to guarantee a frequency of signal transition with the transitions indicating memory timing, with a CDR or "clock data recovery" circuit 1715 used by the controller to extract memory timing.

FIG. 17 presents an example of a memory system 1701 that uses CDR in lieu of a dedicated CTM signal. In particular, the system relies on measuring bitrate of memory device communications, as the bitrate bears a defined relationship to a memory device internal timing. The system 1701 includes a memory device 1703 and a memory controller 1705, the two being connected by a serial data bus that includes one or more SDQ links 1707. In this example, the links are bidirectional links and the memory controller includes a number of transceiver circuits 1709, one for each of the SDQ links. Similarly, the memory device also includes a number of transceiver circuits 1711, also one for each of the SDQ links. A unidirectional CA bus and optional DM bus 1713 are illustrated as generally connecting the memory controller and the memory device, i.e., these links may be drive by slower timing in some embodiments or they may be precisely timed and subject to the same timing considerations (and circuitry) presented below.

The memory controller includes a clock data recovery (CDR) circuit 1715 to detect transitions in one or more of the SDQ links according to known techniques. Importantly, while FIG. 17 is couched in terms of serial data transmission, it is also possible to apply clock data recovery to parallel transmission schemes. The CDR circuit produces a bitrate clock $\Phi_{br}$ (also labeled 1717) which then is fed to a divide-by circuit 1719 and used to generate a wordrate clock 1721, also labeled $\Phi_{wd}$ in FIG. 17. The wordrate clock is used for serial/parallel conversion circuitry within the memory controller (represented by functions 1723 and 1725, respectively), while the bitrate clock is used both by this circuitry and by transceivers 1709. As has been previously discussed, this transmit and receive timing at the controller end may also include per-SDQ-link phase adjustment for each of transmit and receive, such that transmissions to the memory device arrive synchronized with the memory device's internal timing (e.g., at a ninety degree phase offset) for proper sampling and, similarly, such that the transceiver at the controller samples memory device transitions at the maximum data eye opening, accounting for phase propagation offset.

The memory device also includes similar serialize/deserializer circuits 1727 and 1729 and a rate multiplier (or phase interpolator) circuit 1731. The rate multiplier circuit produces a bitrate clock, used by the memory device transceiver circuits 1711 to time transmission and sampling of communications. In this example, the VCO 1733 can be controlled by a programmable register 1735 (the voltage generator is omitted for brevity) and be based on the memory word clock $\Phi_{wd}$, e.g., in this example, the memory timing can be controlled at $\frac{1}{8}^{th}$ (or a different fraction) of the bitrate, with divide-by circuits 1719 and 1731 used to establish the bitrate clock. Other designs are also possible, e.g., the VCO can be controlled to itself produce the bitrate clock, with a divide-by circuit used to produce a wordrate clock. As indicated by numeral 1737, a clock distribution network farms out the bitrate clock signal in a manner that ensures each recipient (e.g., each transceiver) receives its copy of the bitrate clock signal at the same phase.

FIG. 17 also shows encode and decode circuits, used by the memory device (1739 and 1741, respectively) and by the memory controller (1743 and 1745, respectively). These circuits may be used in the CDR scheme depicted in FIG. 17 to create the minimum transition density used to embed a timing signal that can be recovered at the memory controller end of communications. As it is necessary to embed timing only for memory device transmissions, encode and decode functions 1743 and 1741, respectively, are illustrated in dashed lines, to indicate the optional nature of memory controller transmissions; that is to say, a primary implementation of the embodiment of FIG. 17 is where timing is embedded for memory device to controller communications, not necessarily for controller to memory device communications.

The memory controller 1705 sets the VCO control register 1727 in the memory device, to thereby program memory device timing. As memory device timing is embedded in the SDQ signals, the CDR circuit 1715 detects current timing reflects that timing in the generated bitrate and wordrate clock signals $\Phi_{br}$ and $\Phi_{wd}$, respectively. As with the embodiment discussed earlier, measured memory timing is then compared against a reference ("ref") by a comparison circuit 1747, which in turn provides an output used by the controller to change the VCO control register (i.e., to throttle up or down memory timing, as appropriate to the design). The reference ("ref") used as a benchmark is stored in a register 1749 and, if desired, can be retrieved from an external source as represented by optional input 1751.

FIG. 17 also shows the use of two FIFO circuits 1753 and 1755 on the memory controller. These FIFO circuits can be used to transfer communications between a memory clock domain, represented by the right side of the FIFO circuits (e.g., the controller transceivers are part of the memory clock domain), and a memory controller clock domain, represented on the left side of the FIFO circuits and typically including the controller core (not seen in FIG. 17). If desired, the comparison circuit 1747 may use empty and overflow signals from one or both FIFOs as inputs, against which the comparison circuit can assess the early or late nature of memory timing. In such a case, the register 1749 may be omitted, with the comparison circuit relying on controller clock as its reference input (as was presented above in connection with FIG. 7).

FIG. 17 helps illustrate several optional design features. In one example, clock data recovery can be used to help minimize the number of pins and thus avoid the need for a dedicated CTM signal. In addition, if implemented as a serial system (i.e., relying on one or more SDQ signals), FIFOs used for memory clock domain/controller clock domain transition may be used to adjust memory timing against the controller clock domain. The embodiment of FIG. 17 may also be useful with multiple memory devices, whether arranged in a multidrop or P2P configuration. If multiple memory devices are used as part of a multi-frequency, multidrop implementation, it may be desired to have a domain crossing circuit with a mechanism for switching the controller between timing for different memory devices, as was discussed above in connection with FIG. 10.

As has been mentioned previously, the depicted memory devices may be ICs, memory modules having several memory ICs, or another type of device. Certain practical design advantages that can be gained around module based designs are illustrated with reference to FIG. 18.

Figure 18:
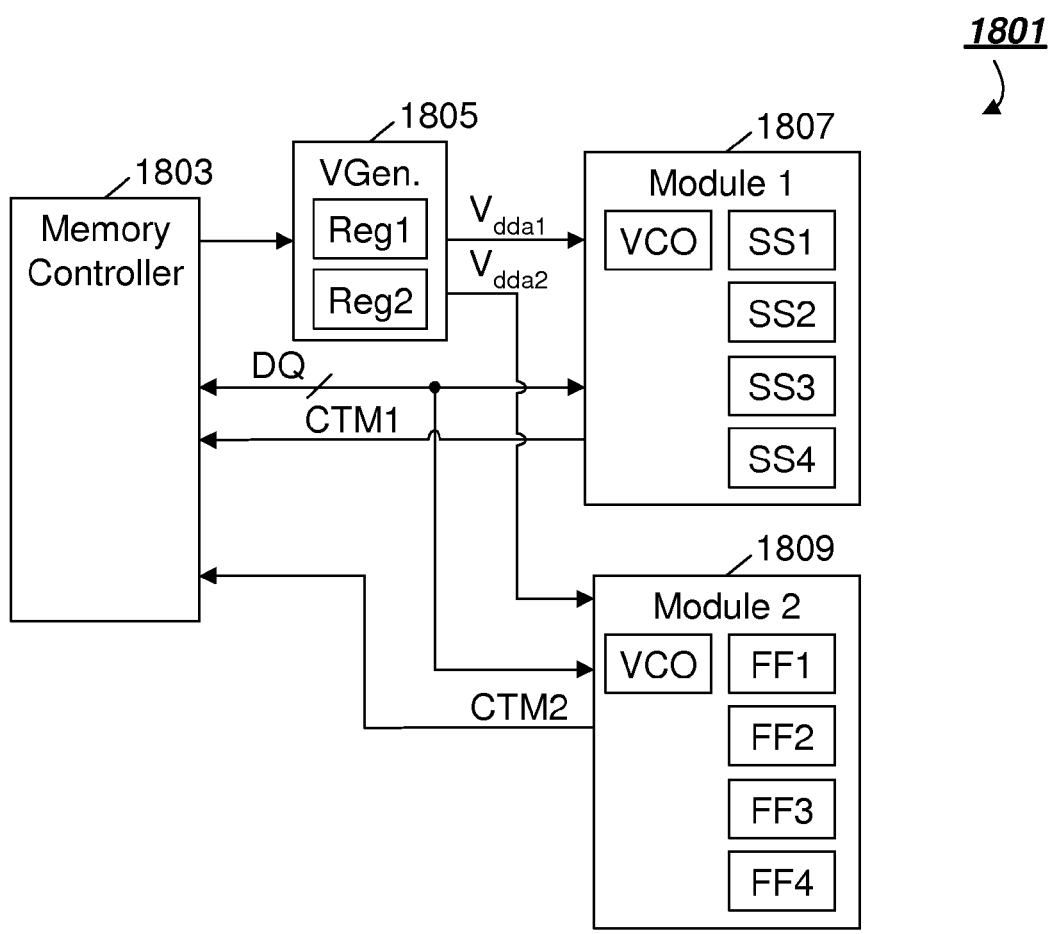
FIG. 18 provides an embodiment 1801 having a memory controller 1803 and two memory modules 1807 and 1809. Each memory module is in this example driven by a dedicated adjustable voltage signal that drives multiple ICs on the particular module 1807 or 1809.

FIG. 18 shows a memory system 1801 having a memory controller 1803, an external voltage generator 1805, a first memory module 1807 and a second memory module 1809. Each memory module includes a number of memory devices and a VCO shared by the number of memory devices. Similarly, the external voltage generator generates one adjustable voltage per module ($V_{dda1}$ or $V_{dda2}$), using a register dedicated to each VCO. As with previous examples, the memory controller measures timing for each module and programmably controls each VCO such that all memory devices for each memory module meet a minimum target bitrate. In this example, each module generates at least one CTM signal used by the controller to provide this feedback.

As has been alluded to previously, memory devices may differ, due to silicon processing variations, in their relative timing. One advantage presented by the modular design seen in FIG. 18 is that similar speed devices may be grouped together at the time of assembly and adjusted as a unit, thereby reconciling use of a large number of memory devices with minimized adjustable voltage generation and distribution circuitry and thus minimizing system power and complexity for the given combination of memory devices.

Figure 19:
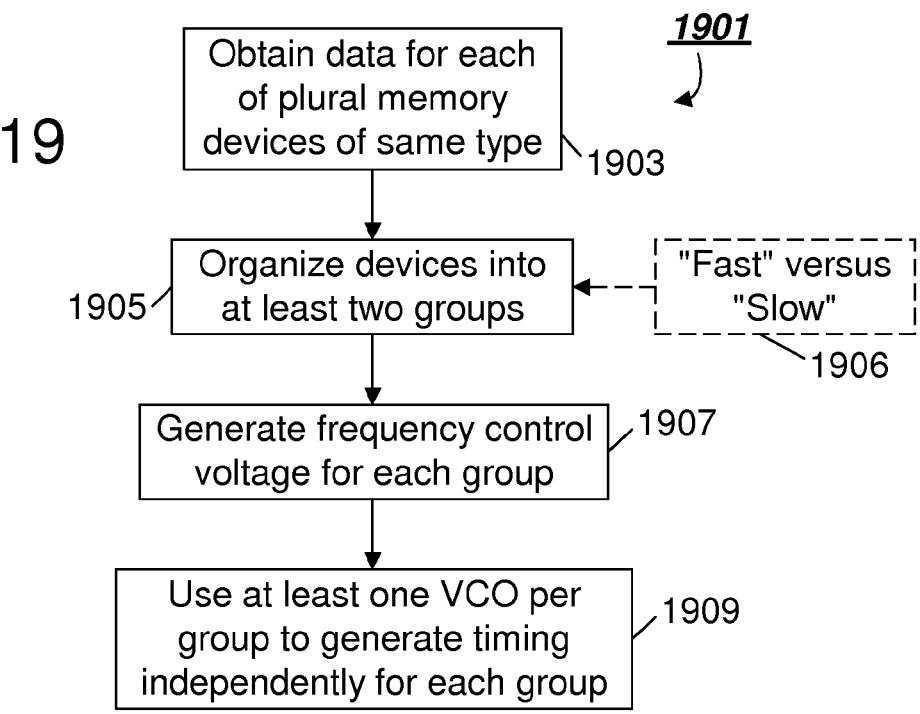
FIG. 19 illustrates a process 1901 for designing a module depicted in FIG. 18.

FIG. 19 presents such a method of performing such grouping as part of a design process 1901. As part of the design process, benchmarking data is gathered on a number of memory devices to be used in a system. For example, in a system having eight memory devices per module, with two or more modules, each memory device can be benchmarked to determine how much VCO voltage it requires to achieve a specific target bitrate, per step 1903. Devices can then be grouped according to VCO voltage required to achieve the target bitrate, for example, organized into groups of eight memory devices representing the fastest and slowest memory devices, and so on. As implied, slow devices may be co-located together on one module, while fast devices may be grouped together on a different module. These processes are implied by steps 1905 and 1906; as indicated by the use of dashed-lines for step 1906, other groupings are also possible. The various modules are then assembled using the selected memory devices and used in run time operation. Thus, notwithstanding relatively fast corners in their respective clock distribution trees, the fast devices ("FF") in this example can be throttled down to slower than normal timing, while the slower devices ("SS") can be throttled up as necessary to meet minimum target bitrate, using a common VCO for each module to drive timing for memory devices on that module; these operations are indicated by numerals 1907 and 1909 of FIG. 19. In alternate embodiments another grouping other than the use of a module may be employed, e.g., with a number of devices grouped under the same VCO control voltage.

The example presented by FIGS. 18 and 19 provide a trade-off which relaxes the requirements for "overdesign" while accommodating FF and SS devices into a system which minimizes the final performance differences between these devices and strives to reduce the power of the system overall regardless of the configuration. Notably, the terms "FF" and "SS" are used for purposes of illustration only, and what FIGS. 18 and 19 help illustrate that similar speed devices may be effectively grouped together during the module manufacturing process. The teachings presented in FIGS. 18-19 may also be combined with the power savings design principles mentioned earlier to achieve even further benefits. It is also worth mentioning that while in conventional systems the use of "FF" devices most often results in the highest power consumption due to the higher current levels, while practicing embodiments of this invention, "FF" devices operate to the specification at the lowest possible power supply voltage, and thus achieve the lowest overall power.

V. CONCLUSION

What has been presented are a number of techniques to facilitate memory device design requirements and permit in-situ adjustment of memory device timing. Applicable to integrated circuits, memory modules, memory controller and other devices, these teachings provide for a more efficient use of memory and provide power savings that should find ready applications in cell phones, portables, and other devices that rely on memory systems. Use of the voltage scaling principles provided above, when applied to circuitry such as IO circuitry and column access circuitry, to provide just one example, may provide for further efficiencies and savings.

It should be noted that the various circuits disclosed above may be described using computer aided design tools and expressed (or represented), as data or instructions embodied in various machine-readable media (i.e., storage media recognizable by computers, such as in electronic memory, CD-ROM, DVD, optical, magnetic or other formats used to read data by machines). Machine-readable media may be used by a computer, such as a personal computer, to design or fabricate an integrated circuit using data stored on the machine-readable media. If desired, the media may alternatively reside internal to the computer (e.g., in the form of data stored on internal electrical, magnetic or optical storage circuitry). The data stored on the media defines a circuit and is ideally in a form which may be used and modified by a designer and applied to the fabrication of physical devices (e.g., chips, such as flash memory chips embodying the principles discussed above). The data may be expressed in terms of their behavioral, register transfer, logic component, transistor, layout geometries, or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES. Other suitable formats and languages may also be used. When received within a machine such as a computer system, such data or instructions may be processed in connection with execution of one or more computer programs including, without limitation, netlist generation programs, place and route programs and the like, to generate a representation or image of a physical manifestation of such circuits. The representation or image may thereafter ideally be used in fabrication, for example, by enabling generation of one or more masks that are used to form various components of the circuits. Resultant devices may be evaluated, with desired changes incorporated back into the data describing the device, as part of a manual design (change) process. Once the design is suitably refined, the data stored on machine readable media may be converted to a format used in the direct control of circuit manufacturing devices.

Figure 20:
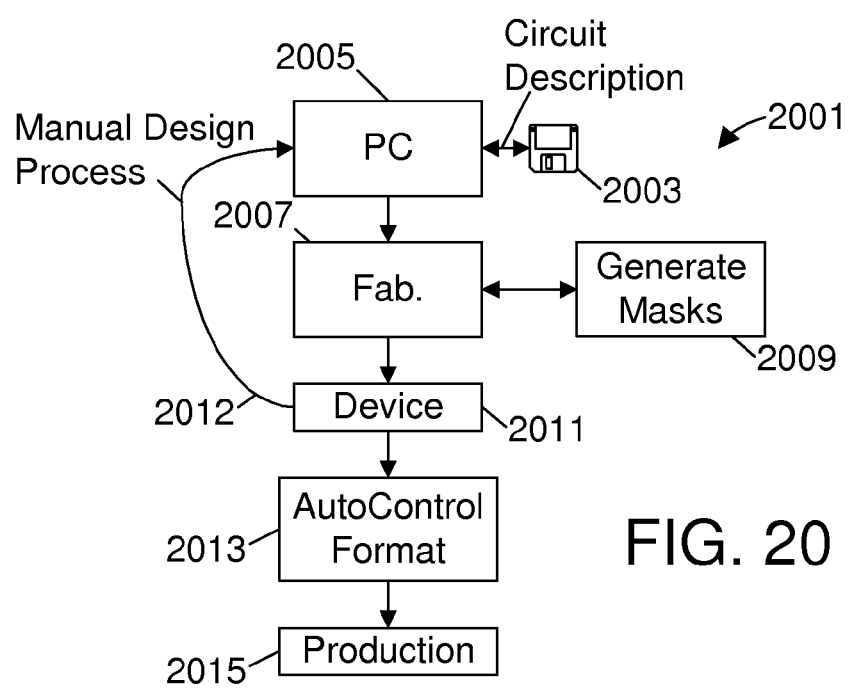
FIG. 20 provides a flowchart 2001 drawing of a circuit description stored on machine readable media 2003. The circuit description provides a memory device, controller or system description that can be used to fabricate part or all of circuits or components (e.g., ICs) illustrated in FIGS. 1-19.

FIG. 20 illustrates a process 2001 that relies upon such a circuit description stored on machine readable media 2003. In particular, the circuit description may be read on a personal computer or other digital operating system, and used in the fabrication of integrated circuit devices, per blocks 2005 and 2007; in this case, the circuit description provides layout information for masks used to create varies layers of semiconductor circuits, per numeral 2009. The result of the fabrication is an integrated circuit which is then optimized using a manual design process, per numerals 2011 and 2012, until a suitably refined circuit description is obtained. Once refined, the circuit description may be converted to a format used to provide instructions to automatically control processing of circuits and eventual production manufacturing, as indicated by process blocks 2013 and 2015.

Various alternatives to the foregoing techniques will readily occur to those having skill in the art. For example, as mentioned, the described techniques can be implemented in other forms of devices, including other forms of memory devices or systems. To provide some examples, many of the embodiments presented above feature a programmable register that is used by a memory controller to control memory device timing, essentially through feedback. Other designs are also possible, including designs where the memory device itself applies feedback (and adjusts contents of its own register), or where a register is "dead reckoned", that is, programmed based on an estimated value, without using feedback. Furthermore, while embodiments have been presented where memory device timing can be dynamically adjusted, for example, during memory device operation, to account for temperature changes and other sources of drift, other implementations are also possible—for example, a memory device can have its timing calibrated once at system assembly, or upon initial power up, via electronic, mechanical or other means.

In the foregoing description and in the accompanying drawings, specific terminology and drawing symbols have been set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. The term "coupled" is used herein to express a direct connection as well as a connection through one or more intervening circuits or structures. The term "exemplary" is used to express an example, not a preference or requirement. Also, the verb "charge" and reference to "charging" expressed above should be understood to refer to current flow in either direction, i.e., current flow in the FIGS. and discussion may be expressed in terms of absolute magnitude or current, and may be driven using positive or negative voltages or current flows, or both, depending on implementation.

Accordingly, the foregoing discussion is intended to be illustrative only; other designs, uses, alternatives, modifications and improvements will also occur to those having skill in the art which are nonetheless within the spirit and scope of the present disclosure, which is limited and defined only by the following claims and equivalents thereto.

We claim:

1. A memory device, comprising:
   a memory core;
   a programmable oscillator that generates a timing signal based on information stored in an externally-programmable register; and
   a data interface for timing exchange of data with an external data channel based on the timing signal;
   where the data interface includes a transmitter to time the transmission of read data to a memory controller according to a transmit clock signal, the transmit clock signal generated using the timing signal; and
   where the externally-programmable register is to receive programming from the memory controller in order to program the programmable oscillator.

2. The memory device of claim 1, where the programmable oscillator generates the timing signal without reliance upon an external clock signal.

3. The memory device of claim 1, where the data interface a receiver to sample write data according to a receive clock signal, the receive clock signal generated using the timing signal.

4. The memory device of claim 3, where:
   the memory device transmits externally the timing signal, contemporaneous with the read data; and
   read data is transmitted by the memory device and write data is sampled by the memory device using the timing signal, according to a common phase.

5. The memory device of claim 1, further comprising a timing output pin dedicated to providing a reference external to the memory device based on the timing signal, the reference including one of a clock signal or a strobe signal.

6. The memory device of claim 1, further comprising an encoding circuit to encode read data for output onto the external channel in a manner that embeds timing based on the timing signal.

7. The memory device of claim 1, embodied as an integrated circuit.

8. The memory device of claim 1, embodied as a memory module.

9. An apparatus for controlling at least one memory device, comprising:
   a memory controller;
   a storage element for the at least one memory device, the storage element used to define a frequency of communication used by the at least one memory device; and
   circuitry resident on the memory controller to compare a reference with the frequency of communication used by a transmitter of the at least one memory device to time the transmission of read data to the memory controller, and to program the storage element responsive to the comparison.

10. The apparatus of claim 9, where the reference is a frequency of a memory controller clock signal.

11. The apparatus of claim 10, where the apparatus controls at least two memory devices and includes a storage element for each memory device, the circuitry to compare a frequency of communication by the respective memory device with the reference and to program the storage element for the respective memory device responsive to the comparison.

12. The apparatus of claim 11, where each storage element includes a register, and where the circuitry programs each register such that the frequency of communication used by the respective memory device is not less than the reference.

13. The apparatus of claim 10, where the at least one memory device is embodied on an integrated circuit distinct from the apparatus, and where the apparatus is to transmit a command to the at least one memory device to cause the memory device to adjust a frequency of read data transmission responsive to the comparison.

14. The apparatus of claim 10, where the at least one memory device includes a memory module.

15. A method, comprising:
   measuring at least one of a clock frequency or a strobe frequency used by a memory device to time transmission of read data to a memory controller, to thereby obtain a value, the at least one being associated with a oscillation signal generated by a programmable oscillator dependent on information stored in a register associated with the programmable oscillator;

comparing the value with a reference; and updating the register to control the programmable oscillator responsive to the comparing.

16. The method of claim 15, where controlling includes using a memory controller integrated circuit to program a memory device integrated circuit embodying the memory device, the programmable oscillator being resident on the memory device integrated circuit.

17. The method of claim 15, where controlling includes programming a voltage generator integrated circuit that is distinct from the memory device and providing an adjustable voltage from the voltage generator integrated circuit as an input to the memory device.

18. The method of claim 15, further comprising performing measuring, comparing and controlling independently for each of plural memory devices.

19. The method of claim 15, further comprising performing measuring and comparing for each of plural memory devices, and controlling for plural memory devices as a group.

20. The method of claim 19, where controlling includes selectively coupling an adjustable voltage in common to each memory device, and selectively inhibiting provision of the adjustable voltage for one of the plural memory device that is relatively faster than another of the plural memory devices.

21. The method of claim 15, where the memory device includes a memory module and where measuring includes measuring at least one of a clock frequency or a strobe frequency used by at least one memory integrated circuit on the memory module.

\* \* \* \* \*